US010505997B2

(12) United States Patent
Linden et al.

(10) Patent No.: US 10,505,997 B2
(45) Date of Patent: Dec. 10, 2019

(54) PROVIDING PERSISTENT ACTIVITY SESSIONS ACROSS CLIENT DEVICES

(71) Applicant: Facebook, Inc., Menlo Park, CA (US)

(72) Inventors: Lee Charles Linden, San Francisco, CA (US); Benjamin Lewis, San Francisco, CA (US); Dwight Ewing Crow, San Francisco, CA (US); Jonathan Shottan, San Francisco, CA (US); Peng Fan, Castro Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 917 days.

(21) Appl. No.: 14/566,673

(22) Filed: Dec. 10, 2014

(65) Prior Publication Data

US 2016/0173540 A1 Jun. 16, 2016

(51) Int. Cl.
*H04L 12/761* (2013.01)
*H04L 29/06* (2006.01)
*H04L 29/08* (2006.01)
*G06Q 30/06* (2012.01)

(52) U.S. Cl.
CPC ..... *H04L 65/1083* (2013.01); *G06Q 30/0633* (2013.01); *H04L 65/4084* (2013.01); *H04L 67/146* (2013.01); *H04L 67/22* (2013.01)

(58) Field of Classification Search
CPC .............................................. G06Q 30/00–08
See application file for complete search history.

(56) References Cited

U.S. PATENT DOCUMENTS

| | | | | |
|---|---|---|---|---|
| 9,009,786 B1 * | 4/2015 | Bueche, Jr. | ........... | G06F 21/445 |
| | | | | 726/2 |
| 2002/0065912 A1 * | 5/2002 | Catchpole | ......... | G06F 17/30873 |
| | | | | 709/224 |
| 2003/0154398 A1 * | 8/2003 | Eaton | ..................... | G06Q 30/08 |
| | | | | 709/227 |
| 2003/0229900 A1 * | 12/2003 | Reisman | ........... | G06F 17/30873 |
| | | | | 725/87 |
| 2008/0273519 A1 * | 11/2008 | Sedeffow | ........... | H04N 7/17318 |
| | | | | 370/345 |
| 2012/0210226 A1 * | 8/2012 | McCoy | ............ | H04N 21/25816 |
| | | | | 715/719 |

(Continued)

FOREIGN PATENT DOCUMENTS

WO    WO-2015027413 A1 *  3/2015  ......... H04L 65/4015

OTHER PUBLICATIONS

A QoS content adaptation framework for nomadic users. El-Khatib, Khalil Mehdi. University of Ottawa (Canada), ProQuest Dissertations Publishing, 2005. NR10965. (Year: 2005).*

*Primary Examiner* — Michael Misiaszek
(74) *Attorney, Agent, or Firm* — Keller Jolley Preece

(57) ABSTRACT

One or more embodiments of the disclosure provide systems and methods for improving a user experience related to interacting with content using multiple client devices and/or mediums. For example, a persistent activity system can receive activity data for a user from a client device. The persistent activity system can generate state information based on the received activity data. Further, the persistent activity system can provide the state information to another client device and/or medium to enable the user to seamlessly resume the user's activity on the other client device and/or medium.

20 Claims, 15 Drawing Sheets

(56) References Cited

U.S. PATENT DOCUMENTS

| | | | | |
|---|---|---|---|---|
| 2013/0104206 A1* | 4/2013 | Waghmare | ............ | H04M 15/70 |
| | | | | 726/6 |
| 2014/0053054 A1* | 2/2014 | Shen | ................... | G06F 16/9577 |
| | | | | 715/234 |
| 2014/0254546 A1* | 9/2014 | L'Heureux | ........... | H04W 12/06 |
| | | | | 370/331 |
| 2014/0359735 A1* | 12/2014 | Lehmann | ............ | H04L 63/0884 |
| | | | | 726/7 |
| 2015/0381740 A1* | 12/2015 | Gwin | ................... | H04L 67/142 |
| | | | | 709/228 |

* cited by examiner

PROVIDING PERSISTENT ACTIVITY SESSIONS ACROSS CLIENT DEVICES

BACKGROUND

1. Technical Field

One or more embodiments relate to systems and methods for interacting with content across one or more client devices. More specifically, one or more embodiments of the present invention relate to systems and methods for improving a user experience when interacting with content across multiple client devices and/or mediums.

2. Background and Relevant Art

Client devices (e.g., computers, tablets, smart phones, etc.) can provide users the ability to view, search, browse, and otherwise interact with large amounts content. For example, content providers can provide content to a user via a variety of content mediums, such as websites, mobile applications, and various other mediums. In many cases, a content provider is a merchant that provides content related to a merchant's products. For instance, a user can search, view, and purchase a merchant's products via a merchant's website.

Many users now access content using a variety of different client devices (e.g., a smart phone, laptop) with a variety of different content mediums (e.g., websites, mobile applications). Conventional systems for providing user content, however, have a number of disadvantages that diminishes the quality of a user's experience when a user accesses a content provider's content from various client devices and/ or through various content mediums. For instance, conventional systems do not provide a seamless user experience (e.g., shopping experience) from one client device to the next, or from one medium to another medium.

In some conventional systems, content providers attempt to provide a seamless user experience across multiple devices, but the quality of the user experience that conventional systems provide is limited. In particular, in many cases, a user must provide login credentials to the content provider each time the user switches to a new client device, which prevents a seamless user experience. For example, when a user switches between client devices and/or mediums, the user must re-login to allow the content provider to re-identify the user and to restore items in the user's shopping cart. However, requiring users to provide login credentials each time they switch to a new client device can inconvenience users, especially when the user cannot accurately recall the user's login credentials.

In addition, while conventional systems can restore some data from a previous user session, conventional systems do not allow the user to actually resume a user experience across multiple client devices. For example, even after a user provides login credentials, conventional systems allow the content provider to present only limited information to the user, such as items in a user's cart. Further, in many conventional systems, the user needs to perform duplicative actions after switching to a second client device to regain or continue a user experience. Accordingly, when a user accesses content with more than one device, conventional systems can be time consuming and frustrating to a user.

In addition, conventional systems fail to provide a seamless user experience to users between different mediums. For instance, conventional systems do not allow for a seamless shopping experience when a user is switching between applications on the same client device. For example, if a user searches for a product on the merchant's website using a web-browser application on a tablet, the user will again have to manually search for the same product after if the user decides to use the merchant's application. Thus, each time a user changes to a new content medium, the user in essence starts a separate user session that is not linked with a user's previous session on a prior content medium.

Accordingly, there are a number of considerations to be made in improving a user experience related to providing content across multiple client devices and/or multiple content mediums.

SUMMARY

One or more embodiments described herein provide benefits and/or solve one or more of the foregoing or other problems in the art with systems and methods for improving a user experience for interacting with content across multiple client devices and/or mediums. For example, the principles described herein provide systems and methods that allow a user to initiate an activity session on a first client device and seamlessly resume the activity session on a second client device. In addition, the principles described herein provide systems and methods that allow a user to initiate an activity session on a first content medium and seamlessly resume the activity session on a second content medium on the same client device, or on a different client device.

In particular, the systems and methods disclosed herein provide a user a seamless user experience for interacting with content using multiple client devices within a single activity session. For example, a user can begin an activity session (e.g., shopping session) by interacting with a content provider's content on one client device, such as a laptop, and continue the activity session on another client device, such as a smartphone. The user can change between client devices and continue an activity session as if the user were interacting with a content provider's content within the same activity session on the same client device. For example, the user may access previous searches, viewed products, items in the user's shopping cart, navigation histories, etc., on multiple client devices within a defined activity session.

To provide a seamless cross-device activity session, one or more embodiments of the systems and methods disclosed herein can associate multiple client devices with a user. Further, the systems and methods disclosed herein can monitor a user's interaction with content during a defined activity session on a first client device and subsequently provide user activity information to a second client device. Thus, upon the user accessing content on the second client device, the systems and methods allow the user to resume the activity session.

Further, the systems and methods disclosed herein provide for seamless cross-medium activity sessions. For example, the systems and methods disclosed herein can associate multiple mediums with a user. In addition, the systems and methods disclosed herein can monitor a user's interaction with content during an activity session on a first medium and subsequently provide user activity information to a second medium. Moreover, the different mediums can be on the same client device, or located on different client devices. Accordingly, the systems and methods disclosed herein can provide an improved user experience in a variety of ways that allows users to access content using multiple client devices and/or mediums within a seamless user experience.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail using the accompanying drawings.

DETAILED DESCRIPTION

Figure 1:
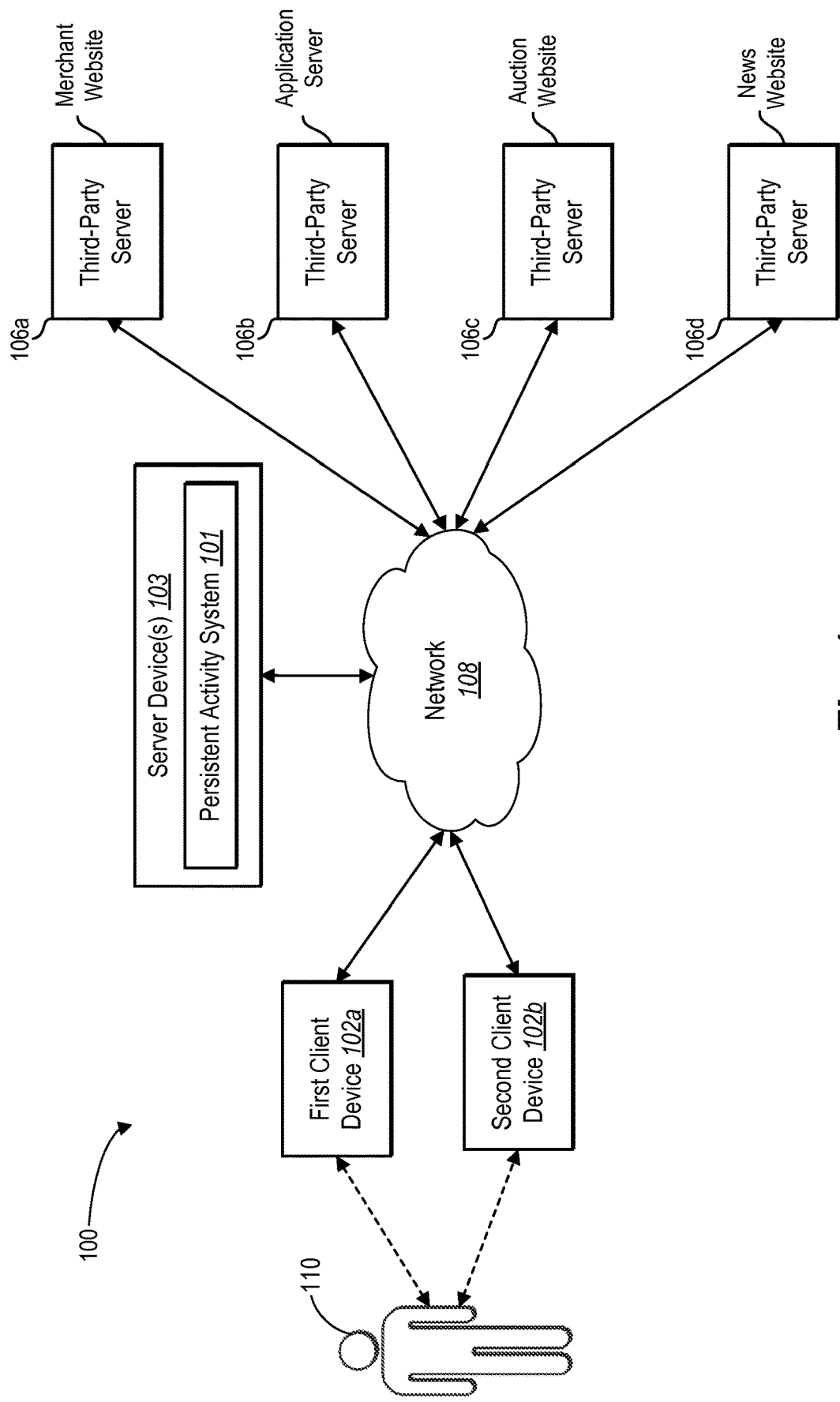
FIG. 1 illustrates a schematic diagram of a communication system in accordance with one or more embodiments described herein.

Embodiments disclosed herein provide benefits and/or solve one or more of the abovementioned or other problems in the art with a persistent activity system that improves a user experience when interacting with content across multiple client devices and/or mediums. In particular, the persistent activity system provides a user a seamless user experience across different client devices during a single defined activity session. Additionally, the persistent activity system provides a seamless user experience across different content mediums during a single activity session, regardless of whether the different content mediums are on a single client device or multiple devices. Therefore, one or more embodiments of a persistent activity system allow a user to seamlessly change between client devices and/or mediums during an activity session without compromising the activity session user experience.

In particular, one or more embodiments of the persistent activity system allow a user to participate in a single activity session across multiple client devices. For example, a user can initiate an activity session on a client device. The user may postpone or pause an activity session on the client device (e.g., another activity may interrupt the user), and then later resume the activity session on another client device. The persistent activity system allows the user to continue the activity session across multiple client devices as if the entire activity session occurred on a single client device.

To illustrate, in one or more embodiments a user can initiate an activity session on a laptop computer by interacting with content from a content provider. For example, a user can initiate the activity session by browsing various products on a merchant's website, making a favorites list, and even placing particular products in a shopping cart. At some point during the activity session, the user's activity session may be interrupted for one of a host of reasons (e.g., running errands, answering the phone, resuming work). At a later time, and wishing to continue browsing the merchant's website, the user may use a smartphone to access the merchant's website. The persistent activity system can allow the user to continue the interrupted activity session (e.g., the activity session initiated on the laptop computer) as if the user had experienced the entire activity session on the smartphone. For example, the persistent activity system can recreate the user's chronological browsing history, the favorites list, and the shopping cart on the smartphone device. In this manner, the user can switch between client devices while maintaining a single seamless activity session.

Further, the persistent activity system can maintain an activity session across multiple client devices without requiring users to provide login credentials (e.g., username and password) to content providers. For example, a user, without logging in, can browse a content provider's website using a first client device. Later, and again without logging in, the user can switch to a second client device and access the same content provider's website. Notwithstanding the lack of the user providing login credentials to the content provider's website from either the first client device or second client device, one or more embodiments of the persistent activity system can cause the second client to resume the activity session the user initiated on the first client device. Therefore, unlike conventional systems that require a login credential to provide the limited previous shopping cart information, the persistent activity system can provide a full seamless user experience without the need of user login credentials. As such, the persistent activity system enhances a user's experience and enjoyment of accessing content across different devices and/or different content mediums.

As will be further explained in detail below, one or more embodiments of a persistent activity system can incorporate and/or interface with various systems, processes, methods and devices to provide one or more of the above features, characteristics, or benefits. In one or more embodiments, for example, a first client device can send a persistent activity system activity data associated with an activity session. In response to receiving activity data, the persistent activity system can generate state information based on the activity data. For instance, the state information can include a level of interest in content, the order the user viewed content, the type of interaction between the user and the content, etc.

In addition, one or more embodiments of a persistent activity system can generate and maintain state information that includes historical activity session states. In other words, a persistent activity system can update a current session state corresponding with an activity session each time the persistent activity system receives additional activity data, while also maintaining a data representing a history of previous session states. In this manner, a persistent activity system can provide content based on previous user activity within an activity session, even when the previous user activity occurred on another client device and/or content medium.

Regardless of the various type of state information, the persistent activity system can provide state information to multiple client devices associated with a particular user to allow the user to have a seamless user experience across the multiple client devices. In particular, the persistent activity system can detect when the user accesses content associated with an activity session on a second client device. Upon detection, the persistent activity system can provide the second client device with state information corresponding to the activity session. Based on the state information, the second client device can resume the activity session at the point the activity session was postponed on the first client device. In addition, based on the state information, the second client device can allow the user to navigate within the activity session even when the previous user activity occurred on the first client device (e.g., navigate back in time within the activity session using a web browser's back button on the second client device).

In one or more embodiments, the persistent activity system can facilitate a seamless activity session between different mediums (e.g., applications). For example, the persistent activity system can provide state information for an activity session to a different application than the application within which the user initiated the activity session. For instance, the persistent activity system can generate state information based on a user's activity on a content provider stand-alone application and provide the state information to a web browser application that displays the content provider's website. In this manner, the user can participate in a seamless activity session across multiple different content mediums.

Further, the persistent activity system may communicate with, or be incorporated within, a social networking system. For example, the persistent activity system can allow a user to initiate an activity session outside of a social networking system and subsequently resume the activity session within the social networking system. For instance, in one or more embodiments, a user can initiate an activity session via a third-party content medium (e.g., third-party website or application), and the persistent activity system can recreate or substantially duplicate the user's activity session within the social networking system. In this manner, the persistent activity system can provide a seamless user experience across different content provider platforms. Further, the persistent activity system can provide this seamless experience whether the user switches between client devices.

As used herein, the term "content" refers to any form of digital data that may be transmitted over a communication network. For example, content can include, but is not limited to, websites, web pages, digital media (e.g., audio, video, images), electronic documents, electronic communication, or any other digital content or combination of digital content. Moreover, as used herein, a "content provider" is any entity that provides content. For example, in some cases, a content provider can be a merchant that provides access to content associated with a merchant, such as content associated with goods and services offered by a particular merchant. In addition, the content provider may be affiliated with a social networking system (e.g., the content provider may have an account and profile page within the social networking system). Furthermore, the content provider may be a third-party content provider that is independent of a social networking system. Additionally or alternatively, the content provider may be a social networking system.

As used herein, the term "interact" or "interacting" refers generally to any type of electronic activity between a user and a content provider. For example, interacting can include a user viewing, browsing, observing, using, researching, and/or otherwise experiencing content provided by a content provider. Moreover, interacting can include facilitating and completing a transaction (e.g., a user making a purchase from a content provider). For example, a user can interact with a merchant by purchasing a product or service via a merchant's website or stand-alone application.

As used herein, the term "product" may refer to a good or service offered by a content provider, such as a merchant. Products can include tangible goods, such as a device, vehicle, gadget, or clothing. Alternatively, products can be intangible, such as a service. Further, products can include virtual goods and services. For example, a product can include digital data, such as a digital document, an application, a video, or an audio file.

The term "activity session," as used herein generally refers to a defined set of user interactions with content. In general, an activity session includes a starting point and an ending point, each of which can be determined using one or more of the techniques described herein. For example, an activity session may include a web-browsing session, a shopping session, a reading session, a researching session, and/or any type of interaction or combination of interactions. In one or more embodiments, a user can participate in multiple activity sessions at the same time (e.g., activity sessions with different content providers).

FIG. 1 illustrates an example embodiment of a communication system 100 (or simply, "system 100"). As shown, the system 100 may include a first client device 102a, a second client device 102b (collectively "client devices 102"), a server device(s) 103 including a persistent activity system 101, and third-party servers 106a-d (collectively "third-party servers 106") that are communicatively coupled through a network 108. Although FIG. 1 illustrates a particular arrangement of the client devices 102, the server device(s) 103, the third-party servers 106, and the network 108, various additional arrangements are possible. For example, the client devices 102 may directly communicate with the server device(s) 103, bypassing the network 108.

As mentioned, the client devices 102, the server device(s) 103, and the third-party servers 106 may communicate via the network 108, which may include one or more networks and may use one or more communications platforms or technologies suitable for transmitting data and/or communication signals. Additional details relating to the network 108 are explained below with reference to FIG. 11.

As further illustrated in FIG. 1, a user 110 may interface with multiple client devices 102 (e.g., the first client device 102a and the second client device 102b) to access content on the server device(s) 103 and/or the third-party servers 106. For example, the user 110 may be an individual (i.e., human user), a business, a group, or other entity. Although FIG. 1 illustrates only one user 110, it is understood that system 100 can include a plurality of users, with each of the plurality of users interacting with the system 100 with one or more client devices 102.

The client devices 102 may represent various types of client devices. For example, the client devices 102 can include: a mobile device such as a mobile telephone, a smartphone, a PDA, a tablet, a laptop; a non-mobile device such as a desktop or server; or any other type of client device. Additional details and examples with respect to the client devices 102 are discussed below with respect to FIG. 11.

As briefly mentioned above, FIG. 1 illustrates that the client devices 102 may also communicate with the third-party servers 106. For instance, a few examples of third-party servers 106 include, but are not limited to, a merchant website 106a, an application server 106b (e.g., smartphone application provider), an auction website 106c, and a news website 106d. In general, each of the third-party servers 106 can provide third-party content to the client devices 102. For example, the merchant website 106a can provide content representative of a merchant's products. As another example, the application server 106b can provide content to a content provider's standalone application installed on the client devices 102. Along similar lines, the auction website 106c can provide content in the form of auction information regarding various products to the client devices 102 to allow the user 110 to participate in an online auction, and the news website 106d can provide content to the user 110 in the form of news and articles (e.g., sports, business, politics, entertainment).

As an overview, upon a third-party server 106 providing content to a client device 102, the client device 102 can send activity data to the persistent activity system 101 on the server device(s) 103. Generally, activity data includes user identification information and third-party content information that identifies one or more characteristics of the content the third-party server 106 provided to the client device 102. For example, the persistent activity system 101 can receive activity data from the first client device 102a for an activity session when the user 110 is browsing content on the merchant website 106a.

Using activity data, the persistent activity system 101 can generate state information for the user's 110 activity session on the merchant website 106a. Further, the persistent activity system 101 can provide the state information for the activity session to the second client device 102b upon the user 110 accessing the merchant website 106a with the second client device 102b. In this manner, the persistent activity system 101 can provide a seamless user experience across multiple client devices for the user 110 to experience third-party content the merchant website 106a provides. Additional details and embodiments will be described below with reference to the remaining Figures.

Figure 2:
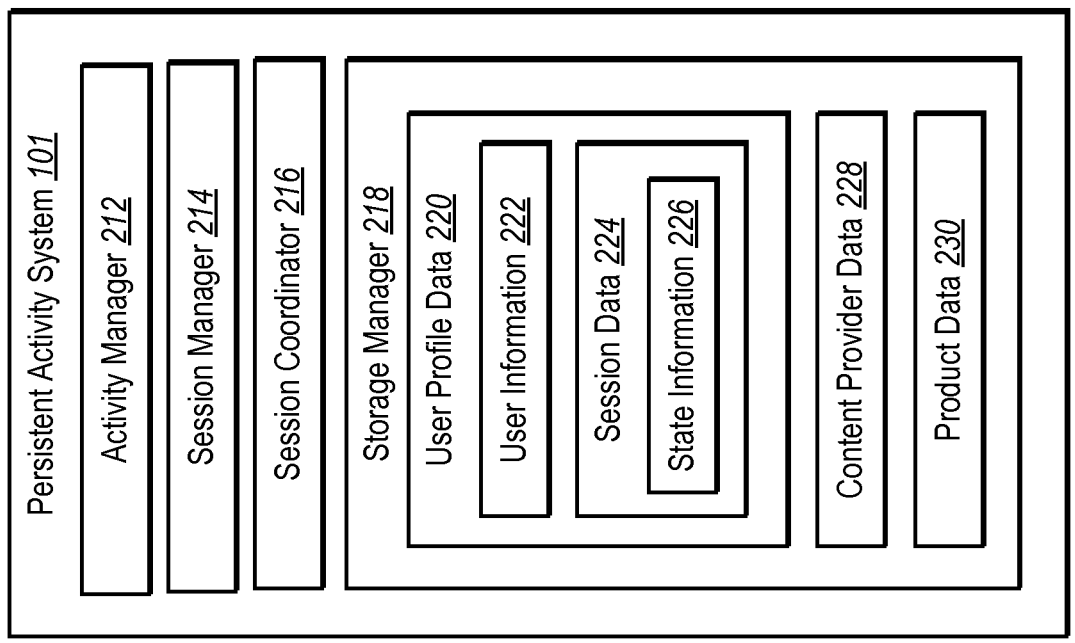
FIG. 2 illustrates a schematic diagram of a persistent activity system in accordance with one or more embodiments described herein.

FIG. 2 illustrates a schematic diagram of a persistent activity system 101. For example, the persistent activity system 101 in FIG. 2 can represent one or more embodiments of the persistent activity system 101 discussed above with reference to FIG. 1. For example, the persistent activity system 101 in FIG. 2 can be part of the server device(s) 103 within the communication system 100 illustrated in FIG. 1. Alternatively, or additionally, the persistent activity system 101 may be part of a social networking system (see FIG. 3).

As illustrated in FIG. 2, the persistent activity system 101 can include, but is not limited to, an activity manager 212, a session manager 214, a session coordinator 216, and a storage manager 218. In general, the activity manager can communicate with client devices to receive activity data corresponding to a user's interaction with content on the client device. The session manager 214 can use the activity data to generate state information for each user activity session. The session coordinator 216 can provide the state information for the activity session to one or more client devices and/or one or more content mediums when the user changes client devices and/or content mediums within an activity session. The storage manager 218 can store and retrieve user data, such as user profile data 220, content provider data 228, and product data 230.

Each component of the persistent activity system 101 may be implemented using a computing device including at least one processor executing instructions that cause the persistent activity system 101 to perform the processes described herein. In some embodiments, the components of the persistent activity system 101 can be implemented by a single server device, or across multiple server devices. Although a particular number of components are shown in FIG. 2, the persistent activity system 101 can include more components or can combine the components into fewer components (such as a single component), as may be desirable for a particular implementation.

As briefly mentioned above, and as illustrated in FIG. 2, the persistent activity system 101 may include an activity manager 212. The activity manager 212 can communicate with client device(s) and/or one or more of the third-party servers to receive activity data. In particular, the activity manager 212 may receive activity data based on a user interacting with content using a client device. For example, the activity manager 212 may receive activity data based from a client device associated with a user based on the user's interactions with content on a content provider's website (e.g., via a web-browser application). Similarly, the activity manager 212 may receive activity data from a client device associated with a user based on a user's interactions with content on a content provider's application server (e.g., via a stand-alone client application).

As a non-limiting example, the activity manager 212 can receive activity data from client devices (e.g., the first client device 102a and the second client device 102b) when a user interacts with content provided by an auction website (see FIG. 1). For instance, the user 110 may interact with content on an auction website using the first client device. In response, the first client device may send activity data to the activity manager 212 indicating the user activity with respect to content on the auction website, such as what product or product category the user viewed, user tagged products, user bids for a product, and/or auction information for products (e.g., auction ending times for products the user viewed, tagged, or bid).

In one or more embodiments, the activity manager 212 can coordinate with one or more client devices as well as one or more third-party servers to facilitate receiving activity data based on user activity. For example, in one or more embodiments, the activity manager 212 may provide a tracking element to a content provider, and the content provider can incorporate the tracking element within content available on a third-party server. For instance, each webpage on a website may include a tracking element (e.g., a tracking pixel). In general, upon a user interacting with third-party content using a client device, the tracking element can cause the client device to provide activity data to the activity manager 212. For example, upon a client device processing the third-party content (e.g., rendering a webpage within a web-browser application), the tracking element can cause the client device to send activity data to the activity manager 212.

In addition to providing tracking elements, the activity manager 212 can also coordinate the association of client devices with a particular user. As described above, multiple client devices can be associated with a single user. In some example embodiments, each client device can maintain a user identifier (e.g., a token or cookie) that indicates the identity of the user associated with the client device. A tracking element can cause a client device to locate the user identifier on the client device, and send the user identifier as part of the activity data. Therefore, based on the combination of user identifiers and tracking elements, the activity manager 212 can associate activity data with particular users without requiring the user to authenticate or provide login credentials when visiting content providers.

In one or more embodiments, the activity manager 212 can also use a device identifier to identify a user associated with activity data. For instance, the activity manager 212 may maintain a data table indicating device identifiers with which a user is associated. In one or more embodiments, the activity manager 212 may receive a device identifier (e.g., a device number such as the device MAC address) when a user authenticates to a server device, and the activity manager can associate the device identifier with the authenticated user. Accordingly, when a client device sends activity data to the activity manager 212, the activity data can include a device identifier for the client device on which the user activity occurred, and thus activity manager 212 can determine a user identity associated with the activity data without the need for the user to login.

In additional and/or alternative embodiments, the activity manager 212 can detect the identity of a user based on a user interacting with a social networking system. For example, the persistent activity system may be incorporated within a social networking system. The activity manager 212 may determine a current user identity of a client device when a user signs into the social networking system from any client device. As such, the activity manager 212 may associate activity data generated while a user is signed into the social networking system with the user without requiring the user to login to a content provider. Further, this may be beneficial when the activity manager 212 cannot determine a user's identity because the client device used by the user is not associated with the user. For example, the client device may be a client device used by a number of users.

Based on the activity manager 212 coordinating the receipt of activity data, the persistent activity system 101 can use activity data to define and manage activity sessions. As mentioned above, and as FIG. 2 illustrates, the persistent activity system 101 may include a session manager 214. The session manager 214 can create and modify (e.g., add, update, organize, format, and/or delete) activity sessions on a per user basis. For example, when a user begins to interact with content, the session manager 214 can generate an activity session, stored as session data 224 within the storage manager 218. Further, when a user completes an activity session, the session manager 214 can remove the corresponding session data 224.

The session manager 214 can analyze activity data to determine whether the activity data corresponds to a new activity session, or whether the activity data corresponds to with a previously created activity session. In particular, the session manager 214 can analyze activity data to identify one or more activity data attributes. Activity data attributes may include a content provider identifier, a content identifier, content information, a timestamp (e.g., when the persistent activity system 101 received the activity data), device information, a user indication of an activity session, and/or any other data or information that may indicate one or more user activity characteristics.

Accordingly, based on the one or more activity data attributes, the session manager 214 can determine whether the activity data corresponds to an active activity session. For example, the session manager 214 can compare the content provider identifier attribute to active activity session attributes to determine if the content provider is currently associated with an active activity session. If the session manager 214 determines that the content provider identifier included within activity data corresponds to a content provider identifier of an active activity session, the session manager can associate the activity data with the active activity session. If, however, the session manager 214 determines that the content provider identifier attribute does not correspond with a content provider in an active activity session, or corresponds with a content provider in an ended activity session, the session manager 214 can use the activity data to create a new activity session.

In one or more embodiments, the session manager 214 can generate an activity session each time a user begins interacting with content for which an activity session does not exist. For example, the session manager 214 can create an activity session each time the user visits a new content provider website and/or application. In particular, the session manager 214 can associate the content provider identifier attribute the activity session. In addition, the session manager 214 can recreate an activity session when the session manager 214 receives activity data for a content provider that is associated with an ended or inactive activity session.

In some embodiments, the session manager 214 can begin a new activity session if an inactivity duration timer elapses. For example, after the session manager 214 determines that received activity data corresponds to an active activity session, the session manager 214 may determine whether the duration between receiving the activity data and the time of the last activity session update exceeds a specified duration of activity (e.g., a week, two weeks, a month, etc.). Alternatively, the session manager 214 can end an active activity session if the activity session is idle for a defined period of time (e.g., no new activity data corresponding to the activity session is received for the defined period of time). For example, the session manager 214 can end an active activity session when the activity session has been idle for over a week.

In one or more embodiments, the session manager 214 may send a notification to the user when an active activity session is about to become inactive or end. For example, the session manager 214 may detect that an active activity session has been idle for a week. Before the session manager 214 ends the activity session, the session manager 214 may notify the user regarding whether the user would like to resume the activity session or end the activity session. The notification may be an email, a message (IM or text), a popup window on the client device, etc. Further, in some embodiments, the session manager 214 may end the activity session or designate the activity session as inactive if the user fails to respond to the notification, for example, within a set time period.

Based on receiving activity data that corresponds to an active activity session, the session manager 214 may prompt the user to resume an active activity session or start a new activity session. For example, upon switching to a second client device and detecting that the user is accessing content associated with an active activity session, the session manager 214 may prompt the user, via the second client device, to decide whether the user would like to resume the last activity session or begin a new activity session. For instance, the session manager 214 can send a communication to the second client device that causes the second client device to present a pop-up notification with a selectable option to resume an activity session and a selectable option to begin a new activity session.

In addition, the session manager 214 can prompt a user to restart an activity session at any time. For example, the session manager 214 can prompt a user to end an activity session. For instance, session manager 214 can determine that a user initiated an activity session based on content from a first content provider. The session manager 214 can then detect that a user accesses content from a second content provider, and in response, the session manager 214 can cause the client device to prompt the user for confirmation that the activity session is complete. The session manager 214 may detect other user activity that indicates the end of an activity session, such as completing a product purchase, a user manually closing an application (e.g., a web-browsing application), or other user actions.

To illustrate, a user may access a content provider application on a mobile device after previously interacting with content on the content provider's website. Upon opening the content provider application, the session manager 214 may cause the mobile device to prompt the user to continue or resume the activity session or begin a new activity session. In one or more embodiments, the prompt can include the options to resume the activity session on the content provider's website, or within the content provider application.

In one or more example embodiments, the session manager 214 can use the activity data to generate, aggregate, organize, format, and update state information. For example, the session manager 214 may aggregate and analyze the activity data to determine state information associated with a particular activity session. For instance, upon receiving activity data corresponding to an active activity session, the session manager 214 can generate and/or update state information to include content views, level of interaction with content, content searches, account history, content comparisons, products in the user's cart, etc. In this manner, the session manager 214 can augment state information to maintain a current or last activity session state, as well as a chronological state history, for each activity session.

More specifically, the last activity session state can indicate the last user interaction, or user activity state, within an activity session. For example, the last activity session state include content with which the user last interacted, such as a product page, a product information screen, a search results page, a user preference screen, a page in the checkout process, a video presentation, an audio presentation, or any other content associated with the last user interaction. In other words, the last activity session state can correspond with the user's last content interaction.

In addition to including content, the last activity session state can reflect various actions that a user performed while within an activity session. For example, when the last activity session state refers to a search results page, the last activity session state can include search filters, sort order, user rankings, etc., applied by the user. The last activity session state can also include current items in a user's cart and/or wish list as well as user preferences.

In contrast to the last activity session state, a historical activity session state can indicate one or more previous session states in an activity session. For example, each time the session manager 214 analyzes additional activity data related to a particular activity session, the session manager 214 may update the historical activity session state to include the previous last activity session state. Alternatively, or in addition, the session manager 214 can generate the historical activity session state based on previous activity data, such as previous content with which the user interacted.

In addition, the session manager 214 can determine an order for the activity data within the historical activity session state based on the chronological order that the user interacted with content within the activity session. In particular, the session manager 214 may associate state information with a timestamp that corresponds to activity data associated with a particular user action or activity. To illustrate, a user may browse product pages A, B, and C on a website, and in the listed order. As such, when the user is viewing product C, the last activity session state includes information that corresponds to product page C and a timestamp. Further, the historical activity session state includes information related to product page A and product page B, along with corresponding timestamps. As such, upon analyzing the historical activity session state, the session manager 214 can determine that the user viewed product page B prior to viewing product page C, and that the user viewed product page A before viewing product page B.

As will be discussed in greater detail below, the state information that the session manager 214 generates for each activity session, including the last activity session state and the historical activity session state, assists in allowing the persistent activity system 101 to provide a seamless activity session across multiple client devices and/or across multiple content mediums. In other words, regardless of the client device and/or content medium that a user uses during an activity session, the user can navigate between the previous activity states and the current activity state of an activity session.

In particular, and as FIG. 2 illustrates, the persistent activity system 101 may include a session coordinator 216 that can coordinate an activity session across multiple client devices. For example, the session coordinator 216 can ensure that a user's activity session is seamless when the user moves from one client device to another client device within an activity session (e.g., initiates an activity session on a first client device, and resumes the activity session on a second client device).

Generally, the session coordinator 216 can provide state information generated based on activity data received from one client device to another client device. In other words, the session coordinator 216 can provide a second client device with the state information corresponding to an activity session a user initiated on a first client device. In this manner, the second client device can use the state information to resume the last activity session state on the second client device and provide the user access to previous activity data (e.g., historical session activity data), such as navigating to previously viewed content in the activity session, providing previous user activities (tagged content, shopping cart items) as well as generally providing any other information needed to allow a user to resume the activity session.

In one or more embodiments, the session coordinator 216 can provide the state information to a client device incrementally. For example, the session coordinator 216 can first provide the last activity session state to a second client device to allow a user to view the content the user was last viewing on the first client device. Then, as the user desires to view previously viewed content from the activity session, the session coordinator 216 can provide some or all of the historical activity session states to the second client device.

To illustrate, a user can use a web-browser to browser a merchant's website. For example, the user can view a first webpage followed by a second webpage on a first client device. The user may then switch to using a second client device. Upon accessing content associated with the same merchant, the session coordinator 216 may provide the second client device with the last activity session state, which enables the second client device to display the second webpage to the user. Then, if the user wants to navigate within the activity session (e.g., view the first webpage), the session coordinator 216 can provide the historical activity session state, or a portion thereof, to the second client device, which enables the second client device to provide the first webpage to the user.

In some example embodiments, the session coordinator 216 can facilitate a seamless activity session between different content mediums (e.g., applications), as mentioned previously. For example, the session coordinator 216 can provide state information to a mobile application for a content provider when the user has previously been browsing on the content provider's website. In addition, the session coordinator 216 can provide state information across a combination of mediums and client devices. For example, a user may be searching for sporting equipment from a content provider using a web-browser on a laptop. Later, the user can continue his or her searching activity session in the content provider's mobile application on a smartphone. In this example, the session coordinator 216 can provide the mobile application on the smartphone with the state information necessary to allow the user to seamlessly continue his or her activity session.

Further, in some example embodiments, the session coordinator 216 can implement state information within a social networking system. For instance, upon detecting the user is logged into a social network system, the session manager 214 may cause the social networking system to prompt to the user to resume a previous activity session, and if so, whether the user would like to remain within the social networking system or be redirected to the content provider's website and/or application associated with the previous activity session.

In one or more embodiments, when a user opts to resume an activity session within the social networking system, the session coordinator 216 can facilitate providing content related to the activity session within the social networking system. In one or more embodiments, the session coordinator 216 can access content maintained within the persistent activity system 101. For example, the session coordinator 216 can access and provide content based on provider data 228 and/or product data 230 within storage manager 218 to the user via the social networking system. Additionally, or alternatively, in one or more embodiments the session coordinator 216 can request content from a third-party server. In one or more embodiments, the social networking system can include a user interface template into which the session coordinator 216 provides content to the user within the social networking system.

As briefly discussed above, and as illustrated in FIG. 2, the storage manager 218 can store and retrieve user data, such as user profile data 220, content provider data 228, and product data 230, as described above. In one or more embodiments, the user profile data 220 may include user information 222 and/or session data 224 for a user. Session data 224 may include state information 226, as described above. User information 222 can include personal information about a user (e.g., name, gender, age, birth date, hometown, etc.), contact information (e.g., residence address, mailing address, current city, email addresses, phone numbers, screen names, etc.), educational information (e.g., school, highest schooling level obtained, time period, class year, concentration, degree, etc.), employment information (e.g., employer, position, employer locations, employment history, etc.), family and relationship information (e.g., married to, engaged to, partners with, parents of, siblings of, children of, cousin of, relationship with, etc.), and other similar types of information.

Figure 3:
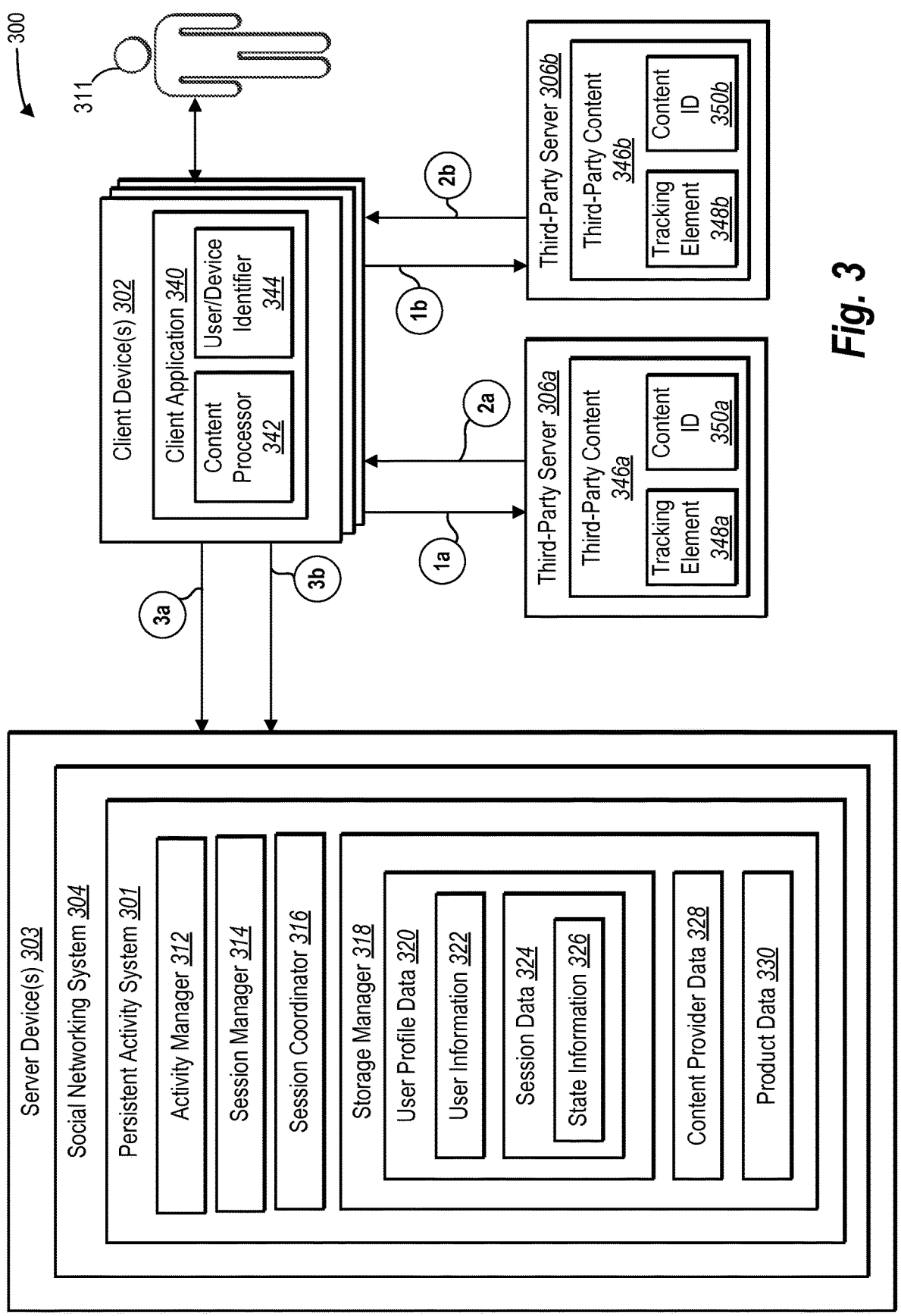
FIG. 3 illustrates a detailed schematic diagram of a communication system including server device(s), client devices, and third-party servers in accordance with one or more embodiments described herein.
Figure 4:
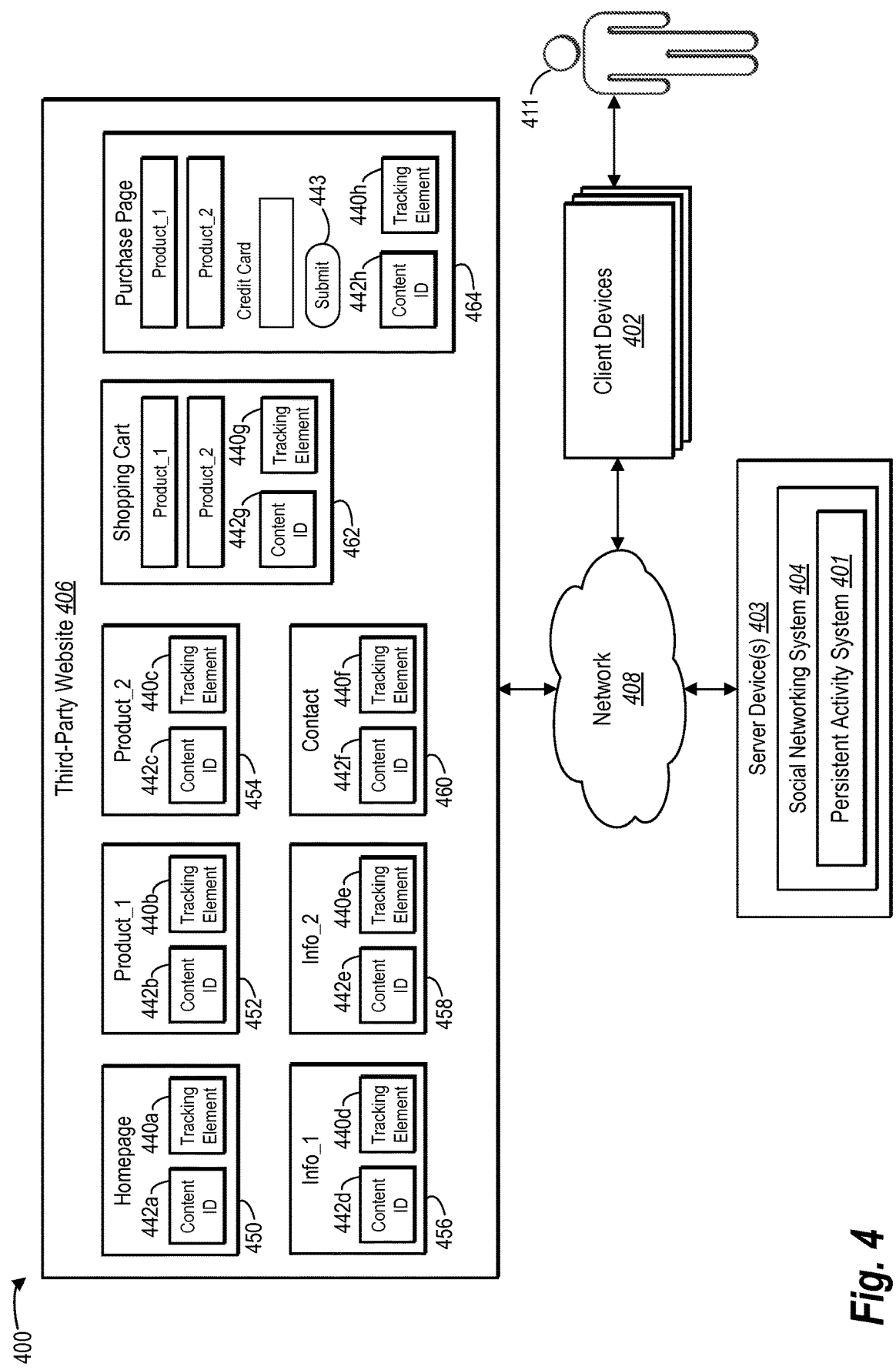
FIG. 4 illustrates a schematic diagram of an example third-party website in accordance with one or more embodiments described herein.

The below discussion with respect to FIGS. 3-4 provides details related to example systems and methods that a persistent activity system can use to track user activity with respect to third-party content, including identifying specific content and associating the specific content with a user profile corresponding to a specific user. Although FIGS. 3-4 discuss various different components of an example persistent activity system, it is understood that the components discussed with respect to FIGS. 3-4 can be combined into a single persistent activity system. In particular, FIGS. 3-4 illustrate that various components of a persistent activity system can be included within a social networking system and/or server device(s).

FIG. 3 illustrates a detailed schematic diagram of a communication system 300 (or simply, "system 300") including server device(s) 303, client device 302, and third-party servers 306*a-b* in accordance with one or more embodiments. Further, the server device(s) 303 can include a social networking system 304 having a persistent activity system 301. The system 300 can represent one or more embodiments of the system 100 discussed above with reference to FIGS. 1 and 2. For example, the client device 302, the server device(s) 303, and/or the third-party servers 306*a-b*, shown in FIG. 3, can include some or all of the features discussed above with respect to client devices 102, social server device(s) 103, and third-party servers 106*a-d*, respectively.

In general, and as FIG. 3 illustrates, a user 311 can interface with the one or more client device 302 and cause the client device 302 to send and receive electronic information to and from the social networking system 304, which may be located within the server device(s) 303, and the third-party servers 306*a-b*. For example, the user 311 can use the client device 302 to communicate with the social networking system 304 to provide users with a seamless activity session as the user switches across multiple client devices and/or mediums.

As illustrated in FIG. 3, the social networking system 304 may include a persistent activity system 301. The persistent activity system 301 in FIG. 3 may be an example embodiment of the persistent activity system 101 described above in connection with FIGS. 1-2. For example, the persistent activity system 301 can include an activity manager 312, a session manager 314, a session coordinator 316, and a storage manager 318 that correspond to the activity manager 112, the session manager 114, the session coordinator 116, and the storage manager 318 described above in connection with FIG. 2.

In one or more embodiments, the user 311 can use the client device 302 to communicate with the social networking system 304, such as to post messages/updates, view social networking content (e.g., posts, pictures, messages), interact with content (e.g., "like" or "comment" with respect to the social networking content), search content, etc., as described above. Further, the user 311 can interact with the client device 302 to communicate with one or more third-party servers 306a-b, as shown in FIG. 3. For example, as illustrated in FIG. 3, the user 311 can use the client device 302 to request third-party content 346a and 346b from third-party servers 306a and 306b, respectively. The third-party servers 306a-b, in response to a request for content, can provide third-party content 346a-b to the client device 302 for presentation to the user 311 on the client device 302.

In particular, and as illustrated in FIG. 3, the client device 302 can include a client application 340 that allows the client device 302 to request and receive third-party content 346. For example, in one or more embodiments, the client application 340 may be a web browser application. Alternatively, the client application 340 may be a standalone application having a particular purpose, such as a merchant shopping application, a music application, a streaming video application, a game application, or any other type of application, program or combination of hardware and software that at least in part facilitates receiving third-party content 346a-b from the third-party servers 306a-b.

Notwithstanding a particular client application 340, in one or more embodiments, the client application 340 may include a content processor 342. For example, the content processor 342 can be a combination of software, hardware, and/or firmware associated with, or accessed by, the client application 340 that processes the third-party content 346a-b that the client application 340 receives from the third-partyer servers 306a-b. In particular, content processor 342 can process code associated with third-party content 346a-b in order to present the third-party content 346a-b to the user 311.

In one or more embodiments, for example, the content processor 342 can include a rendering engine within a web browser application. The rendering engine can render third-party content 346a that the client device receives from third-party server 306a. For example, in the event that the third-party content 346a includes a HTML document, the rendering engine can read the HTML document and render the HTML elements into a graphical presentation. In one or more additional embodiments, the content processor 342 can render, present, play, and/or process various types of third-party content 346, such as digital image content, video content, audio content, and any other type of digital content.

As further illustrated in FIG. 3, the client application 340 can include a user/device identifier 344 (or simply, "identifier 344"). Generally, the identifier 344 includes data that identifies the user 311, as described above. For example, in one or more embodiments, the identifier 344 can include the user's 311 social networking system user ID that can be used within the social networking system to identify the user 311. Alternatively, the identifier 344 can include a client device ID that is associated with the user 311 within the social networking system 304. For instance, given the user's 311 client device ID, the social networking system 304 can lookup the user's 311 social networking system user ID within the social networking system 304. In one or more embodiments, the identifier 344 may include more than one identifier 344 associated with user 311.

Notwithstanding the type of identifier 344, the location of the identifier 344 on the client device 302 can vary from one embodiment to the next. For example, and as illustrated in FIG. 3, the identifier 344 can be located within the client application 340. In particular, the client application may control, update, and otherwise provide the identifier 344. Alternatively, the identifier 344 may be located on the client device 302, but not necessarily be directly associated with or included within client application 340. For instance, the client device 302 may maintain the identifier 344 such that several client applications have access to the identifier 344.

In the event that the client application 340 is a web browser, the identifier 344 can be a cookie (e.g., web cookie, browser cookie, etc.). In general, a cookie is a small piece of data sent from a source to the client device and stored in association with the web browser. In one or more embodiments, the cookie includes data that identifies a user 311, such as the user's 311 social networking user ID and/or a client device ID associated with the user 311. In one or more embodiments, the identifier 344 is a cookie that is associated with a domain that is different from a domain of a website that the web browser is currently presenting. For example, in one or more embodiments, the identifier 344 is a cookie that is associated with a domain corresponding to the social networking system 304 and/or the persistent activity system 301, or in other words, the social networking system 304 and/or the persistent activity system 301 placed the cookie within the client application 340 or on the client device 302 (e.g., when the user 311 accessed the social networking system 304).

To illustrate, the user 311 may have used the client application 340 (e.g., web browser) to login to the social networking system 304. Along with providing the client application 340 with the user's 311 social networking page, the social networking system 304 and/or the persistent activity system 301 also provides a cookie associated with the social networking system 304 that includes the user's 311 identification information, as described above.

Although, in the above example embodiment, the identifier 344 can be a cookie that corresponds to the social networking system 304 and/or the persistent activity system 301, the cookie can be activated upon the client application 340 receiving third-party content 346a. For example, the content processor 342 can process third-party content 346a from the third-party server 306a (e.g., render a website in a web browser), and in response, the identifier 344 within the cookie, or a copy of the entire cookie itself, is sent to the social networking system 304 and/or the persistent activity system 301. Thus, as described above, the client device 302 can send user identifier 344 to the social networking system 304 and/or the persistent activity system 301 upon the content processor 342 processing third-part content 346a.

A cookie is only one example of the identifier 344. Alternatively, the identifier 344 can include, but is not limited to, a session variable, an IP Address associated with the client device 302, a unique device identification number (e.g., MAC address) of the client device, URL query strings, and any other identification information associated with the user 311 via the client device 302.

Additionally, in one or more embodiments, the client application 340 and/or the client device 302 may include multiple identifiers 344 that are each associated with the social networking system 304 and/or the persistent activity system 301. In particular, the social networking system 304 and/or the persistent activity system 301 can send multiple identifiers 344 to the client device 302 and/or client application 340. In one or more embodiments, the multiple identifiers 344 can each interact with various different applications and various types of third-party content 346 so that the user's 311 interactions with third-party content 346 can be tracked and associated to the user 311 within the persistent activity system 301. For example, a first identifier 344 can be associated with a web browser application, while a second identifier 344 is associated with a mobile application.

Furthermore, one or more embodiments of the communication system 300 may not require an identifier. For example, in one or more embodiments, the user 311 may have established an active social networking system session through the client device 302 (e.g., the user 311 is signed into the social networking system 304 through a web browser or social networking system application). At the same time, the user 311 can cause the second client application 340 to request, receive, and process third-party content 346. In such a case, the social networking system 304 and/or the persistent activity system 301 can use the active social networking system session to detect the user's 311 third-party content activity on the client device 302. For instance, the social networking system 304 can use a web application that is able to detect the user's 311 third-party content activity, such as looking at a product webpage. Since the social networking system 304 already registers the identity of the user 311, the social networking system 304 and/or the persistent activity system 301 can associate the third-party content activity with the user 311 without an identifier 344.

Regardless of the particular embodiment of the client application 340, the user 311 can use the client device 302 to request and receive third-party content 346a-b from one or more third-party servers 306a-b, as illustrated in FIG. 3. Various aspects of the third-party servers 306a-b will be discussed with reference to third-party server 306a, although the various aspects may apply to both third-party servers 306a-b. In particular, third-party server 306a can include third-party content 346a that is available to send to the client device 302. Third-party content 346a can include any digital content that a third-party server 306a can provide to the client device 302.

In addition, and as shown in FIG. 3, the third-party content 346a can include a tracking element 348a and a content ID 350a. Generally, the tracking element 348a and the content ID 350a are used by the advertisement system 300 to identify the third-party content 346a (e.g., categories, products, sales, images, comments, reviews, etc.) with which the user 311 interacts using the client device 302. For example, the tracking element 348a may include one or more tracking pixels (e.g., JavaScript or another piece of software code) that can cause the client device 302 to send the social networking system 304 information related to the third-party content 346a and the user 311 (e.g., the identifier 344 and the content ID 350a). Alternatively, or additionally, the tracking element 348a may be in the form of a software development kit (SDK) or other code executable on mobile device platforms.

Regardless of a particular embodiment of the tracking element 348a, the tracking element 348a can be included within the third-party content 346a such than when the third-party server 306a sends the third-party content 346a to the client device 302, the tracking element 348a is also sent to the client device. For example, the tracking element 348a can be included in the markup language of a webpage. Thus, when the content processor 342 processes the third-party content 346a (e.g., renders the content), the content processor 342 also reads and executes the tracking element 348a, causing the client device 302 to send an electronic communication to the persistent activity system 301 that includes identification information about the user 311 and the third-party content 346a.

As FIG. 3 further illustrates, and as briefly described above, the third-party content 346a can also include, or be associated with, a content ID 350a. The content ID 350a can be a unique identifier that corresponds to the third-party content 346a. For example, the content ID 350a can comprise data associated with a particular product, merchant, topic, or combination of the above. The third-party content 346a can include the content ID 350a such that the third-party server 306a sends the content ID 350a to the client device 302 along with the third-party content 346a. For instance, in one or more embodiments, the content ID 350a can be embedded within the tracking element 348a.

In one or more embodiments, the third-party provider (e.g., a merchant and/or advertiser) assigns the content IDs 350a. For example, a merchant can assign each of its products a unique content ID. The merchant can then associate the unique content ID with each piece of third-party content (e.g., web page) that corresponds to a particular product. The merchant can provide a list of content IDs and corresponding products to the persistent activity system 301. Therefore, given the content ID associated with third-party content 346a, the persistent activity system 301 can identify a particular product, as will be discussed in detail below.

In addition to identifying a particular product, topic, and/or merchant, the content ID 350a can also identify features of the third-party content 346a that may indicate a user's level of interest in the third-party content 346a. For example, the content ID 350a can be associated with a "shopping cart" web page that indicates the user has placed one or more products into an online shopping cart. Similarly, the content ID 350a can be associated with a "purchase confirmation" web page that indicates the user has purchased one or more products via an online purchasing process.

In one or more embodiments, the third-party server 306a can dynamically generate the content ID 350a to indicate information about the third-party content 346a. For example, a first part of the content ID 350a may indicate that the web page is a "shopping cart" web page. In addition, a second part of the content ID 350a can indicate one or more products that are currently in the shopping cart. Thus, as the user adds or removes items from the shopping cart, the content ID associated with the shopping cart web page is updated to reflect the products currently in the shopping cart. Various other methods of generating and assigning the content ID 350a to the third-party content 346a can be used, such as using UPC codes, or other such previously defined identifiers, as the content ID 350a.

Regardless of the particular form of the content ID 350a, the system 300 can use the content ID 350a to allow the social networking system 304 to identify the third-party content 346a that the user 311 accesses. For example, FIG. 3 illustrates an example embodiment of the client device 302 providing the persistent activity system 301 with activity data that allows the persistent activity system 301 to identify and associate activity data with a user profile.

In particular, step 1a in FIG. 3 can include the user 311 causing the client application 340 to send a request to the third-party server 306a for third-party content 346a. In response, Step 2a in FIG. 3 can include the third-party server 306a providing the client application 340 the third-party content 346a. As explained above, the third-party content 346a can include the tracking element 348a and the content ID 350a. Upon receiving the third-party content 346a, the content processor 342 within the client application 340 can process the third-party content 346a. As part of processing the third-party content 346a, the content processor 342 can process the tracking element 348a. The tracking element 348a can cause the client application 340 and/or client device 302 to identify the identifier 344 and the content ID 350a associated with the third-party content 346a.

In addition, FIG. 3 illustrates step 3a that shows that the tracking element 348a can cause the identifier 344 and the content ID 350a to be sent to the social networking system 304 and/or persistent activity system 301, representing activity data. Thus, the client device 302 can send the social networking system 304 and/or persistent activity system 301 activity data that indicates the user's 311 activity with respect to the third-party content 346a.

As further illustrated in FIG. 3, the system 300 can follow the same or similar process for providing the social networking system 304 with the user's 311 activity with respect to third-party content 346b. For example, in response to a request from the client device (step 1b) third-party server 306b can send the client device 302 the third-party content 346b that includes the tracking element 348b and the content ID 350b (step 2b). The content processor 342 can then process the third-party content 346b, including the tracking element 348b, which causes the client device 302 to send the identifier 344 and the content ID 350b to the social networking system 304 and/or persistent activity system 301 (step 3b). Therefore, using the above principles, the system 300 can provide systems and methods of associating the activity data with a user, regardless of the source of the third-party content. The system 300 can then user the user profile data 320 to remarket products to users 311 within the social networking system 304, as described above.

As discussed above with respect to FIG. 3, the system 300 can be used with various types of third-party content. FIG. 4, for example, illustrates one or more embodiments of third-party content that can be incorporated within a communication system 400 (or simply "system 400"). In particular, a user 411 can use a client device 402 to interact with a third-party website 406 and social networking system 404, and described above with reference to FIGS. 1-3. For example, the third-party website 406 that can represent a content provider's website (e.g., see FIG. 1) that may be associated with a merchant. Regardless of the particular content within the third-party website 406, the principles described with reference to the third-party website 406 are applicable to any third-party content disclosed herein.

As further illustrated in FIG. 4, the third-party website 406 can include multiple web pages 450, 452, 454, 456, 458, 460, 462, and 464 (collectively "web pages"). Each of the web pages can include particular content or information that is distinct from the other web pages. For example, the home page 450 and contact page 460 may include general information about a particular merchant. Moreover, Product_1 page 452 and Product_2 page 454 may include general information directed at particular products. Likewise, Info_1 page 456 and Info_2 page 458 can include detailed information related to products 1 and 2, respectively. In addition, third-party website 406 can include a shopping cart page 462 indicating products the user 411 has placed into a virtual shopping cart, and a purchase page 464 indicating products the user 411 purchases through the third-party website 406.

As further illustrated in FIG. 4, each web page can include a tracking element 440a-h as discussed above with respect to FIG. 4. In addition, each web page can include a content ID 442a-h, where each content ID 442a-h is a unique identifier associated with the content of the corresponding web page. Thus, when the client device 402 receives a particular web page from the third-party website, the client device 402 processes the tracking element 440 associated with the particular web page, and sends activity data, including the content ID associated with the particular web page, to a social networking system 404 and/or a persistent activity system 401, and the user's 411 user profile (e.g., user profile data 320) is updated with the new activity data, as discussed above in detail.

Due to each web page being associated with a unique content ID, it is possible to track the level of interest a user may have in a particular product. For example, if the third-party activity data only indicates that the user interacted with the homepage 450, the system 400 may indicate a general interest in the merchant's products. Additionally, however, if the third-party activity data indicates that the user interacts with the Product_1 page 452, the system 400 can infer that the user 411 shows more than a general interest with respect to Product_1. Moreover, if the user 411 further interacts with Info_1 page 456, the system 400 can further infer that the user 411 shows an additional level of interest in Product_1 because the user 411 took the time to further research details relating to Product_1. The same would be true with respect to the user's 411 interaction with Product_2 page 454 and Info_2 page 458.

In addition, the system 400 can infer an even greater level of interest with respect to products 1 and 2 if the user 411 decides to place the products into a shopping cart, as illustrated in the shopping cart page 462. For example, upon placing products 1 and 2 into the shopping cart, the third-party website 406 can provide a shopping cart page 462 that has a content ID that indicates a shopping cart page 462, as well as indicates the products that are included within the shopping cart. Thus, the system 400 can infer that the user 411 has a fairly high level of interest in products 1 and 2. Moreover, and as illustrated in FIG. 4, the system 400 can conclude user interest in a products 1 and 2 upon the user 411 purchasing the products 1 and 2, as indicated on the purchase page 464. Using the observed levels of interest, the system 400 assist a persistent activity system 401 and/or a social networking system 404 with providing a seamless user experience to users across client devices and/or mediums.

Figure 5A:
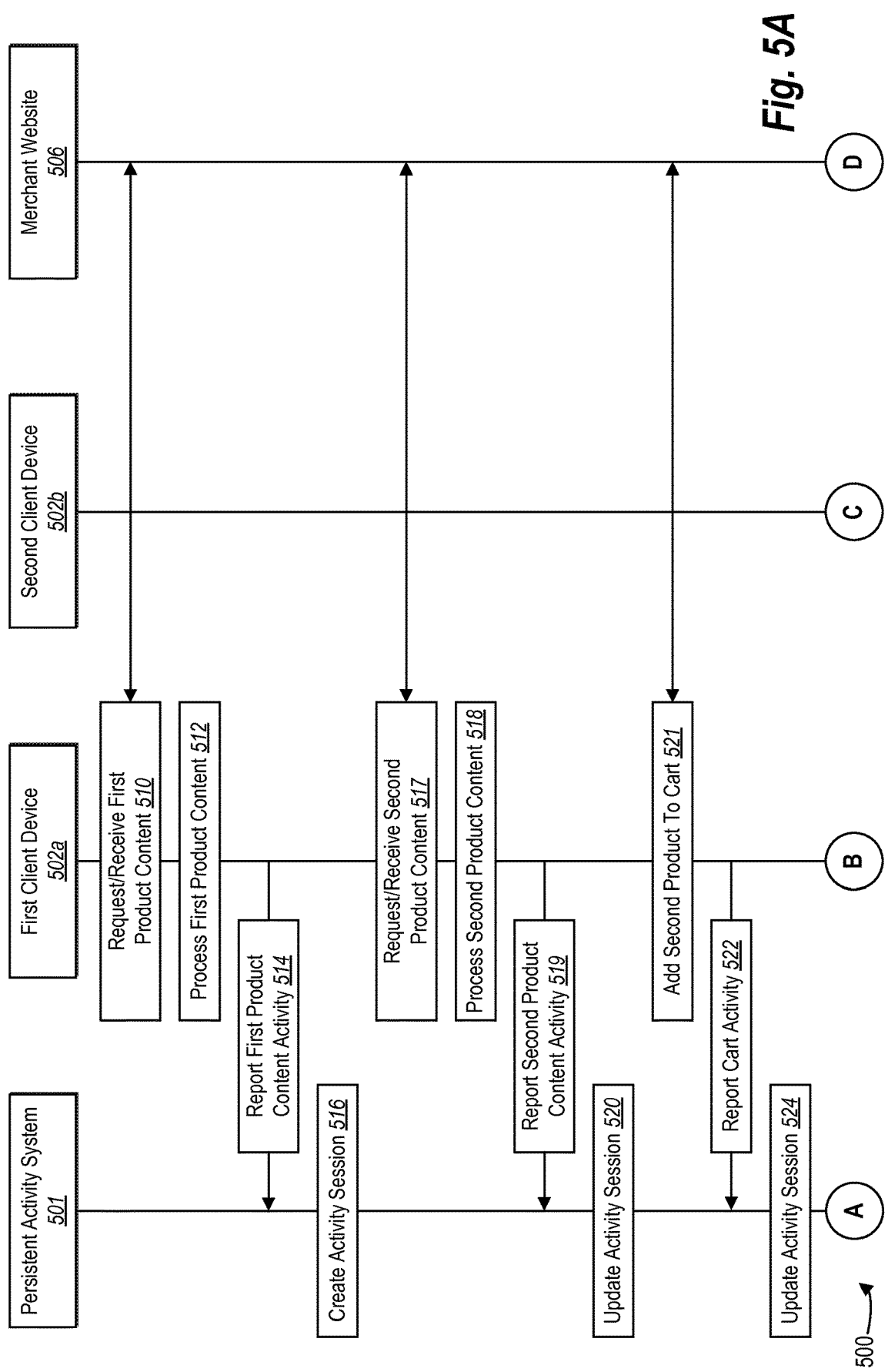
FIGS. 5A-C illustrate a process diagram of a use activity session across multiple client devices in accordance with one or more embodiments described herein.
Figure 5B:
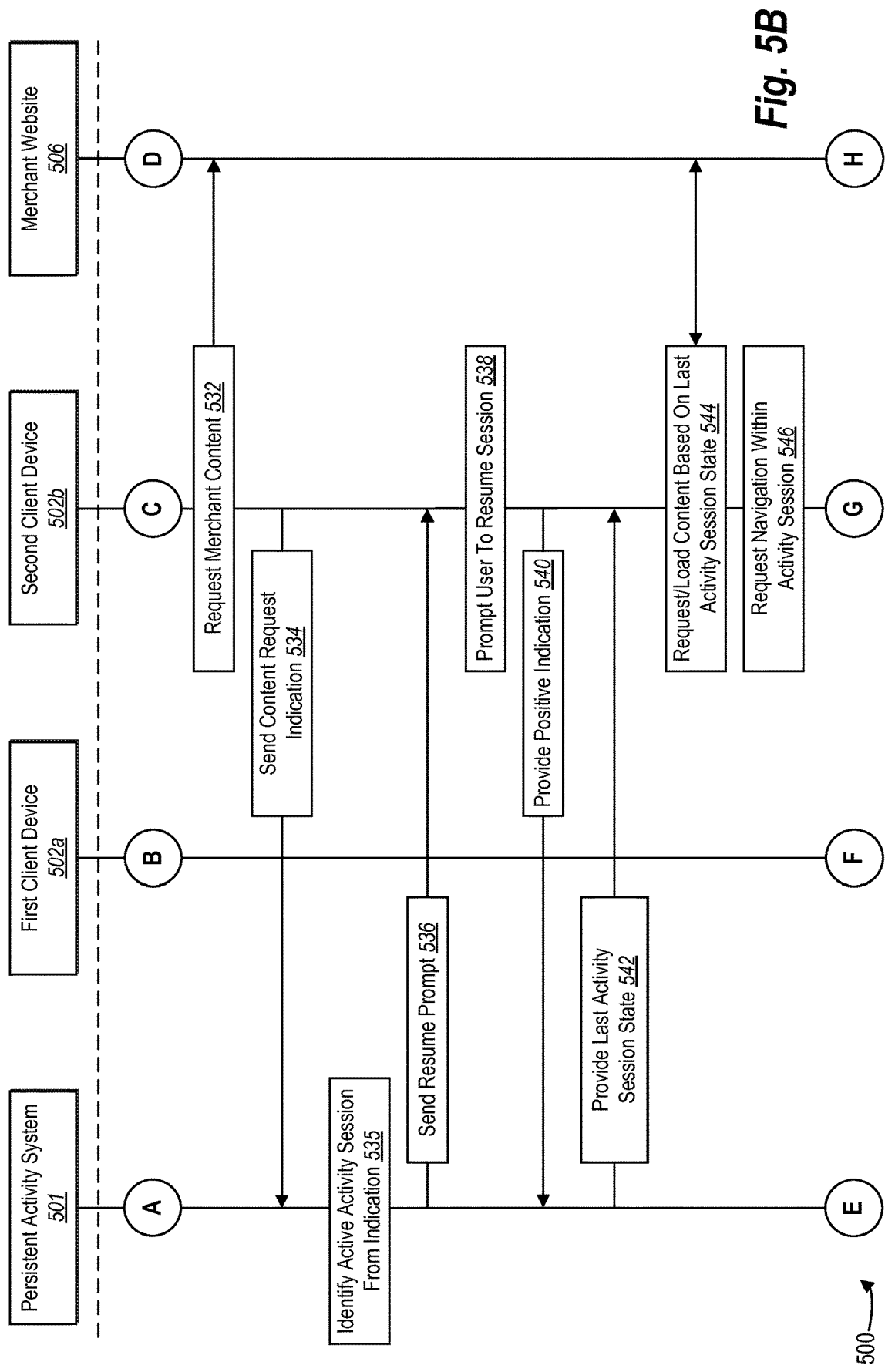
Figure 5C:
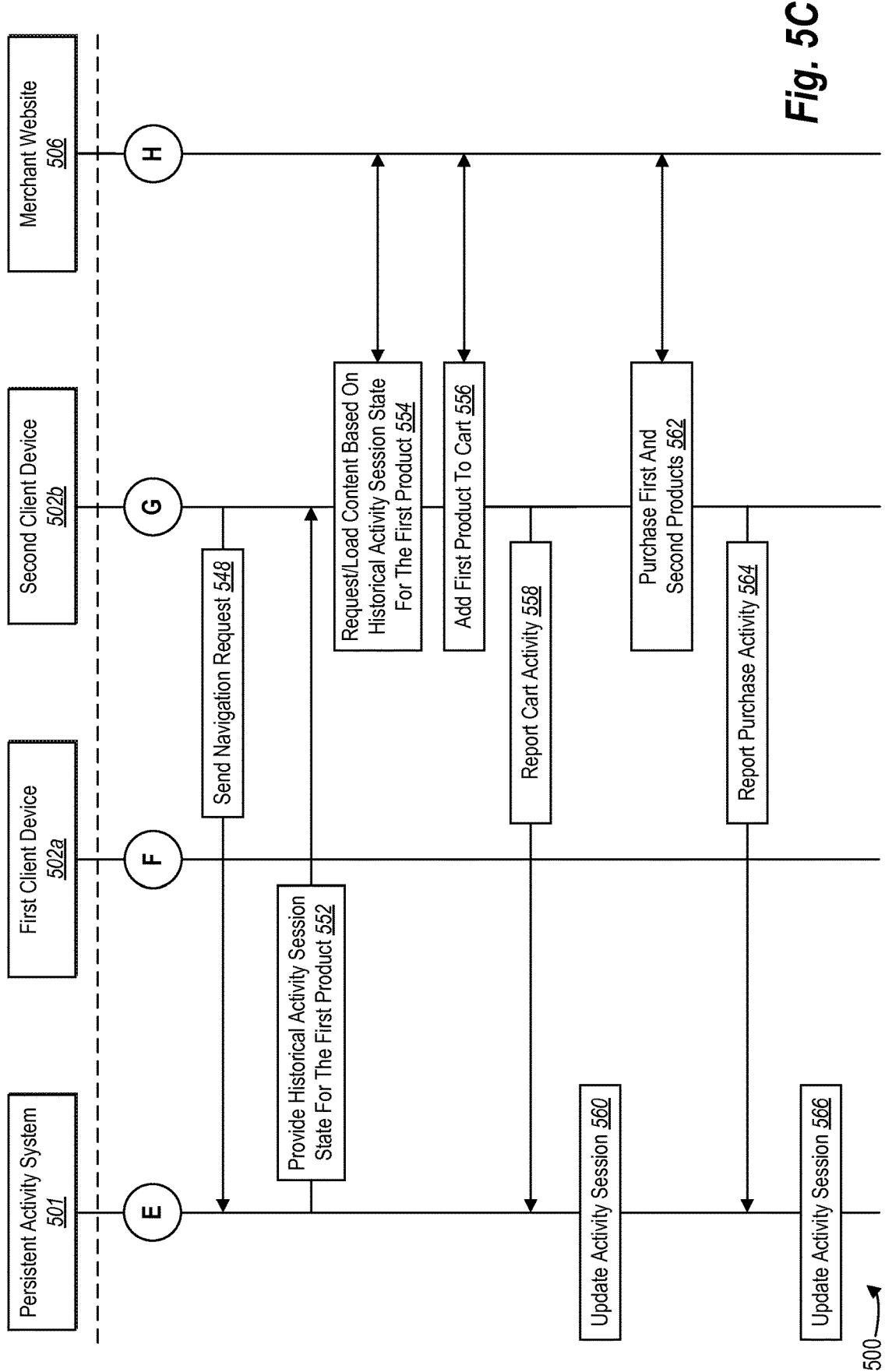

FIGS. 5A-5C illustrates a process 500 of seamlessly maintaining a user's activity session with a merchant website 506 across multiple client devices in accordance with one or more embodiments described herein. Although FIGS. 5A-5C illustrate an activity session with respect to a merchant website, it should be understood that a process-flow involving other types of third-party content providers (e.g., application server, new website, auction website) can include similar or the same processes and steps as illustrated with respect to the merchant website 506.

The process 500 can include a variety of components. In one or more embodiments, for example, the process-flow can include a persistent activity system 501, a first client device 502a, a second client device 502b, and a merchant website 506 (e.g., a merchant website). The persistent activity system 501, the first client device 502a, the second client device 502*b*, and the merchant website 506 illustrated in FIG. 5 may be example embodiments of the persistent activity system, the first client device, the second client device, and the third-party servers discussed above with respect to one or more of FIGS. 1-4. In other embodiments, the first client device 502*a* and/or second client device 502*b* can be replaced within the flow diagram as a first content medium and/or second content medium, according to the principles discussed in detail above.

As illustrated in FIG. 5A, the process 500 can include a user causing the first client device 502*a* to request and receive content from the merchant website 506, as shown in step 510. For example, the user may use a client device, such as a laptop or desktop computer, to request and receive product webpages. For instance, a merchant may sell a first product on the merchant website 506, and accessing merchant content can include a user causing the first client device 502*a* to request and receive webpage content associated with the first product from the merchant website 506.

Upon receiving the merchant content, the first client device 502*a* can provide the content to the user via the first client device 502*a*. For example, and as illustrated in FIG. 5A, in the event the content is a webpage associated with a first product, the process 500 can include step 512 that includes the first client device 502*a* processing the first product content. For instance, processing the content could include the first client device 502*a* rendering and presenting a webpage associated with the first product to the user. As discussed above, based on the type of content, processing the content may include using one or more techniques, such as playing a music file, playing a video file, executing a program, saving a file, or any other method of handling content on the first client device 502*a*.

In response to processing the first product content, and as further illustrated in FIG. 5A, the process 500 can include step 514 that includes the first client device 502*a* reporting the first product content activity to the persistent activity system 501. For example, the first client device 502*a* can send activity data to the persistent activity system 501. In particular, and as described above, the first client device 502*a* may send a user identifier and a content identifier to the persistent activity system 501 based on processing a tracking element included in the webpage content associated with the first product, as described in detail above.

Upon receiving the activity data, the persistent activity system 501 can create an activity session, shown as step 516. For example, the persistent activity system 501 may determine, as described above, that the received activity data does not relate to an active activity session. As such, the persistent activity system 501 may create a new activity session and associate the received activity data with the new activity session. In addition, the persistent activity system 501 can generate state information (e.g., a last activity session state or historical activity session state(s)) to associate with the activity session, as explained in detail above.

In one or more embodiments, the persistent activity system 501 may maintain, as part of the last activity session state, the content identifier associated with the first product, the time when the user requested the first product content, and how long the user viewed the first product (e.g., the time period between receiving the first product activity data and receiving activity data associated with another product or another third-party content provider), a URL associated with the product, whether the user interacted further with the webpage associated with the first product (e.g., selected product options, read comments and/or reviews). In one or more embodiments, The persistent activity system 501 may also include additional content information in the last activity session state and/or in association with the activity session, as described above.

FIG. 5A further illustrates that process 500 can include a step of the user causing the first client device 502*a* to request and receive additional content from the merchant website 506 using similar steps as described above with reference to steps 510-514. In particular, the first client device 502*a* can request webpage content from the merchant website 506 associated with a second product, shown as step 517. As further illustrated in FIG. 5A, upon receiving the second product content, the first client device 502*a* can process the second product content 518 (e.g., render and display a webpage associated with the second product), which in turn can cause the first client device 502*a* to report second product content activity 519 to the persistent activity system 501.

In step 520, FIG. 5A illustrates that the persistent activity system 501 can update the activity session. For instance, the persistent activity system can determine that the received activity data related to the second product corresponds with the same content provider for an activity session that is currently active, as described above. Thus, the persistent activity session can augment the activity session with the activity data related to the second product by updating the last activity session state information to be correspond to the second product webpage, as well as updating the first product webpage information to be part of the historical activity session state information.

FIG. 5A further illustrates an example of when the user interacts with the webpage content associated to the second product to add the second product to a shopping cart 521. For instance, while viewing the webpage associated with the second product, the user can use the first client device 502*a* to select an option within the webpage to add the second product to a shopping cart associated with the merchant website. Based on the user selecting the option to add the second product to the shopping cart, the first client device 502*a* can send additional activity data to the persistent activity system 501. For example, and as illustrated in FIG. 5A, step 522 shows the first client device 502*a* can report cart activity data to the persistent activity system 501. As previously described above, the persistent activity system 501 can determine the cart activity data corresponds to the previously created activity session, and therefore, the persistent activity system 501 update the activity session to include information that indicates that the user added the second product to the shopping cart.

As mentioned above, an interruption may cause the user to stop the activity session using the first client device 502*a*. Alternatively, the user may desire to simply switch to another client device. Regardless of the reason that the user changes client devices, the user may desire to resume the activity session on another client device. For example, FIG. 5B illustrates a portion of the process 500 related to user requesting content from the merchant website 506 via a second client device 502*b*.

In particular, step 532 of FIG. 5B illustrates that the user may cause the second client device 502*b* to request merchant content from the merchant website 506. For example, the user can enter the URL associated with the merchant website, or otherwise cause a web-browser application installed on the second device 502*b* to request content from the merchant website. Based on the second client device 502*b* requesting merchant content, the second client device 502*b* can send activity data to the persistent activity system 501. In particular, the activity data can include a content request indication 534, as illustrated in FIG. 5B. The content request indication can include a user/device ID, content request information (e.g., URL information), and any other activity data information as explained above.

Upon receiving the content request indication, the persistent activity system 501 can attempt to identify an active activity session that corresponds to the activity data received from the second client device, as FIG. 5B indicates. If the persistent activity system 501 identifies an inactive or ended activity session or does not identify any corresponding activity session, the persistent activity system 501 may send instructions to the second client device 502b to begin a new activity session between the user and the merchant.

In the event the persistent activity system 501 identifies an active activity session that corresponds with the activity data, the persistent activity system 501 may send a prompt to the second client device 502a to provide the user an option to resume the activity session, as shown in step 536. Upon receiving the resume prompt, step 538 illustrates that the second client device 502b can provide the resume session prompt option to the user. For example, the resume prompt may be provided to the user within a popup window, within a toolbar, within a separate browser tab, or through any other presentation that allows the user to provide an indication, based on the prompt, that the user desires to continue the previous activity session with respect to the merchant website 506. In one more embodiments, the prompt can include instructions to cause the second client device 502b to present a variety of messages to the user, for example, "Would you like to resume you shopping session?" or "You have items in your shopping cart, would you like to keep shopping?" Alternatively, the prompt may be a selectable option that allows the user to resume their activity session or begin a new activity session.

As further illustrated in FIG. 5B, based on receiving a user interaction indicating the user's desire to resume the activity session, the second client device 502b can provide a positive indication 540 to the persistent activity session. Upon receiving the positive indication, the persistent activity system 501 can provide the last activity session state 542 to the second client device 502b, as illustrated in FIG. 5B. In one or more embodiments, the persistent activity system 501 can allow a user to select a user preference such that the persistent activity system 501 provides the second client device 502b the last activity session state 542 without the prompt steps 526-540. For example, instead of sending a prompt to the second client device 502b, the persistent activity system 501 can directly proceed to sending the second client device 502b the last activity session state to allow the user to resume an active activity session. In such an embodiment, the persistent activity system 501 can cause the second client device 502 to provide a "new session" prompt to the user (e.g., pop-up window). Therefore, although the persistent activity system 501 can cause the activity session can to directly resume on the second client device 502b, the new session prompt can allow a user to start a new activity session.

Regardless of whether the persistent activity system 501 includes a user prompt or user preference configuration, based on the second client device 502b receiving the last activity session state, the second client device 502b can request and/or load content 544 from the merchant website in accordance with the last activity session state, as also shown in FIG. 5B. For example, the last activity session state can include the content IDs (e.g., product IDs), URL addresses, and other information that allows a web-browser on the second client device to request content from the merchant website to provide the content the user last viewed (e.g., the second product webpage), and the state of the session (e.g., the second product included in the cart).

As such, the user may interact with the merchant website 506 on the second client device 502b as if the user had remained on the first client device 502a. To illustrate, after resuming the activity session on the second client device 502b, the user may desire to navigate back to the webpage associated with the first product. In one or more embodiments, the user may simply interact with a "back" navigation graphic element within the web-browser application interface. In response to the user providing an indication of navigating within the previous activity session, the second client device 502b may send the navigational request 548 to the persistent activity system 501.

Based on receiving the navigational request, the persistent activity system 501 may provide historical activity session state information for the activity session to the second client device 502b. In particular, the persistent activity system 501 may provide the historical activity session state corresponding to the first product 552. Similar to as described above, the second client device 502b can request and/or load content base on the historical activity session state for the first product 554, as illustrated in FIG. 5C. For instance, the second client device 502b can process the information within the historical activity session state to request and receive webpage content associated with the first product from the merchant website 506.

In some embodiments, the persistent activity system 501 may send the historical activity session states to the second client device 502b along with the last activity session state when initially sending activity session information to the second client device 502b. In other words, persistent activity system 501 can provide the second client device 502b with the entirety of the activity session state information in the first instance. In this manner, the second client device 502b may directly access the historical activity session state information when a user desires to navigate to previously viewed content with an activity session, and thereby eliminating the need of the second client device 502b to request additional activity session state information from the persistent activity system 501.

In one or more embodiments, the activity session state information can include instructions to the second client device 502b to simulate the user's action on the second client device 502b based on the actions the user performed on the first client device 502a. In other words, the persistent activity system 501 can instruct the second client device 502b to create the activity session history on the second client device 502b (e.g., creating a similar web-browser history on both devices by duplicating the same actions on both devices). Alternatively, the persistent activity system 501 may send instructions to the second client device 502b to have a medium, such as a web-browser or application, load activity session information as if it occurred on the second client device 502b (e.g., import a web-browser history into a web-browsing application on the second client device 502b). Further, the persistent activity system 501 may employ a combination of the above described techniques and methods.

Referring again to FIG. 5C, notwithstanding whether the user navigates within the activity session, the user can perform additional user activity with respect to the content from the merchant website 506. For example, and as shown in FIG. 5C, the user can provide user input to add the first product to the shopping cart 556 on the merchant website 506. The addition of the first product in the shopping cart is additional user activity that was previously not part of the activity session. Therefore, the second client device 502*b* may report the additional cart activity 558 to the persistent activity system 501, and the persistent activity system 501 may update the activity session 560 to reflect the user's activity of adding the first product to the cart, as illustrated in FIG. 5C, and as explained in detail above.

Using the second client device 502*b*, the user can continue to perform additional user activity with respect to content on the merchant website 506, causing the second client device 502*b* to send additional activity data to the persistent activity system 501, and the persistent activity system 501 can further update the activity session according to the additional activity data. For example, in addition to requesting additional content (e.g., webpages) associated with products, and/or adding products to the shopping cart, the user may ultimately decide to make a purchase. For instance, and as illustrated in FIG. 5C, the user can purchase the first and second products 562. Specifically, the user can provide payment information, shipping information, and any other information necessary to allow the merchant website 506 to facilitate an online transaction.

Based on the user making a purchase via the merchant website 506, the second client device 502*b* can report the purchase activity 564 to the persistent activity system 501, and the persistent activity system 501 can update the activity session 566 with the purchase activity, and the as illustrated in FIG. 5C. In one or more embodiments, based on receiving the purchase activity data, the persistent activity system 501 can end the activity session. Alternatively, the persistent activity system 501 may maintain the active activity session for a period of time in case the user subsequently desires to review the purchase (e.g., view a purchase receipt, shipping information, etc.). For example, the user may later use the first client device 502*a* to visit the merchant website 506, and the persistent activity system 501 can cause the first client device 502*a* to present the user with the detail of the purchase (e.g., the last activity session state) on the first client device 502*a*.

Figure 6:
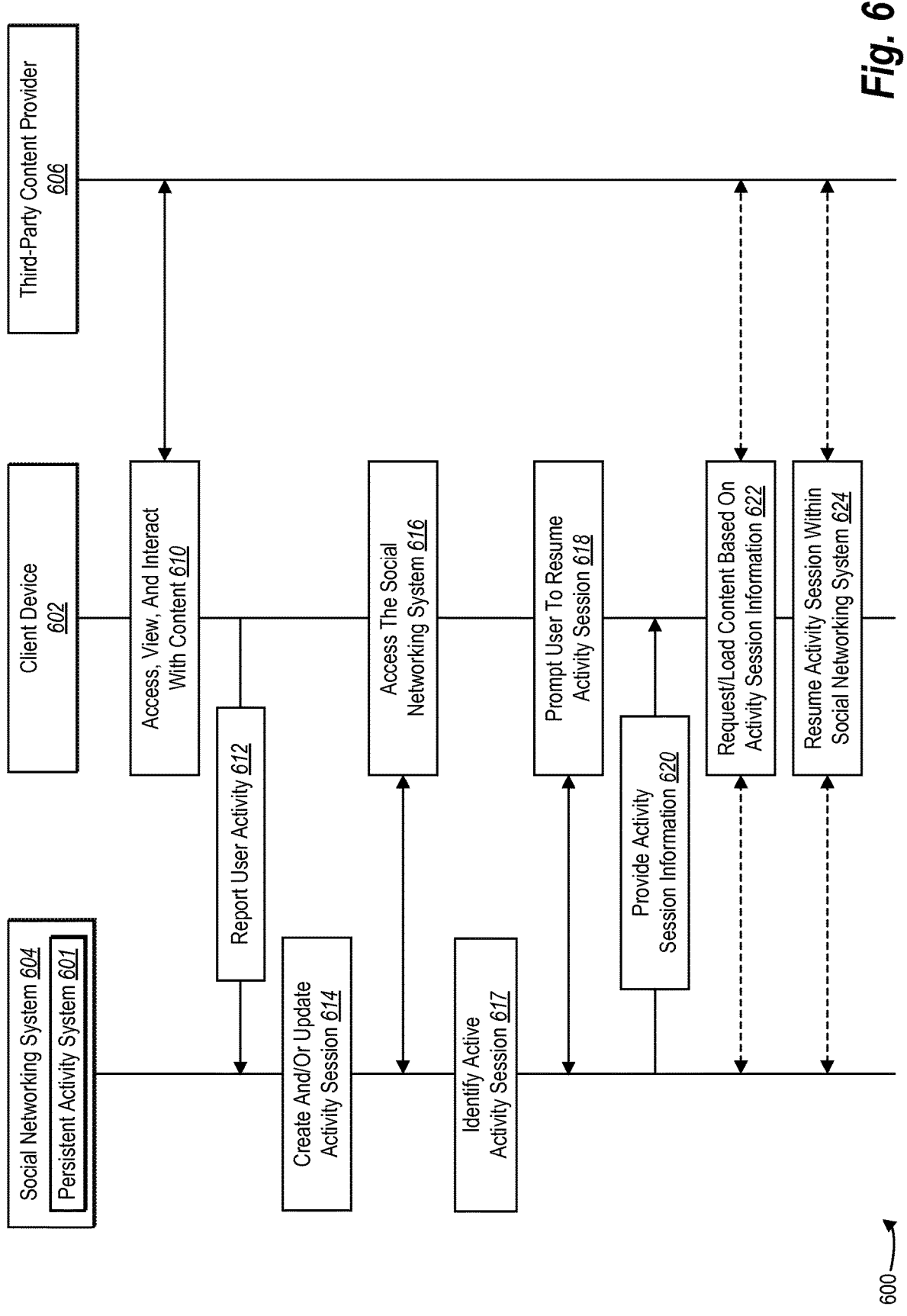
FIG. 6 illustrates a process diagram of a user activity session across a content provider and a social networking system in accordance with one or more embodiments described herein.

FIG. 6 illustrates a process 600 of providing a seamless user experience for interacting with third-party content across different content mediums. For example, a user can initiate an activity session on a third-party content provider, and then later resume the activity session within a social networking system. In particular, and as illustrated in FIG. 6, the process 600 can include a social networking system 604 with a persistent activity system 601, a client device 602, and a third-party content provider 606 (e.g., a merchant website).

The method 600 may include a user viewing, accessing, and interacting with content provided by the third-party content provider 606 using the client device 602, as shown in step 610. Based on the user's activity with the content provided by the third-party provider 606, the client device 602 can report the user activity (e.g., send activity data) to the social network system 604 and/or the persistent activity system 601, as step 612 illustrates. Further, the persistent activity system 601 can create and/or update an activity session based on the user activity that the persistent activity system 601 receives from the client device 602, shown in step 614. Steps 610-614 in FIG. 6 can be the same or similar to the corresponding steps discussed above with respect to FIG. 5A.

Additionally, process 600 can include the user accessing the social networking system 604 via the client device 602. For example, the user may access the social networking system 604 via a web-browser or stand-alone application located on the client device 602. In one or more embodiments, the social network system 604 can detect the user has accessed the social networking system 604. For instance, detecting the user accessing the social networking system 604 may include verifying that the user has a presence on the social networking system 604 (e.g., the user is signed into the social networking system).

Upon the user social network system 601 detecting the user has access to the social networking system 604, the social network system can query the persistent activity system 601 to determine the existence of any active activity sessions 617 associated with the user. For example, the social networking system 604 can query the persistent activity system 601 by providing the user ID of the user the social networking system 604 detected accessing the social networking system. In one or more embodiments, the query can include device ID information, and based on the device ID, the persistent activity system can determine if the user is on the same or different device compared to the device used previously within an activity session.

Based on identifying an active activity session, the social networking system and/or persistent activity system 601 can prompt the user to resume the activity session 618, as illustrated in FIG. 6. For example, using activity session information from the persistent activity system 601, the social networking system 604 can prompt the user to resume their activity session within the social networking system 604. For instance, the client device 602 may display a variety of information or messages within a graphical interface of the social networking system, such as, "Do you want to keep shopping?" Messages and prompts can be integrated within a graphical user interface of the social networking system 604. For example, in one or more embodiments, the prompt can be included in advertisement areas, in news feeds, in messages, in notifications, status updates, or any other areas of the social networking system 604 graphical user interface.

In one or more embodiments, the user can chose to resume the activity session within the social networking system 604. For example, the persistent activity system 601 can provide the social networking system 604 and/or client device 602 with activity session information 620 corresponding to an active activity session, as illustrated in FIG. 6. In particular, the persistent activity system 601 can provide a last activity session state and/or historical activity session states, as described above. In one or more embodiments, the activity session information is not provided to the client device 602, but rather the social networking system 604 uses the activity session information to request, receive, identify, and/or otherwise obtain third-party content in accordance with the previous activity session.

As illustrated in FIG. 6, the process 600 can include the client device 602 requesting/loading content based on the activity session information. For example, based on the activity session information, the social networking system 604 can send state information corresponding to the activity session that enables the client device 602 to resume the activity session within a user interface of the social networking system 604. For instance, based on the session activity from the persistent activity system 601, the social networking system 604 can provide the client device 602 the last session state (e.g., the last viewed webpage), as well as any products in the user's cart. In addition, the user can navigate within the activity session (e.g., view previously viewed content) while remaining within the social networking system 604. Further, the persistent activity system 601 can allow the user to interact with content from the third-party content provider 606 without exiting the social networking system 604.

In this manner, the persistent activity system 601 can allow a user to initiate a content activity session via a third-content provider 606, and then resume the activity session within the social networking system 604. In other words, the persistent activity system 601 can allow a user to begin an activity session with a third-party content provider, and then resume the activity session with another content provider. Further, the persistent activity system 601 allows a user to seamlessly continue an activity session across mediums and/or across client devices. For example, the user may interact with content using a stand-alone application provided by a third-party content provider 606. Then, the user may continue the activity session by accessing a website provided by the third-party content provider using a web-browser. Additionally, or alternatively, the user may resume the activity session within the social networking system 604.

Figure 7:
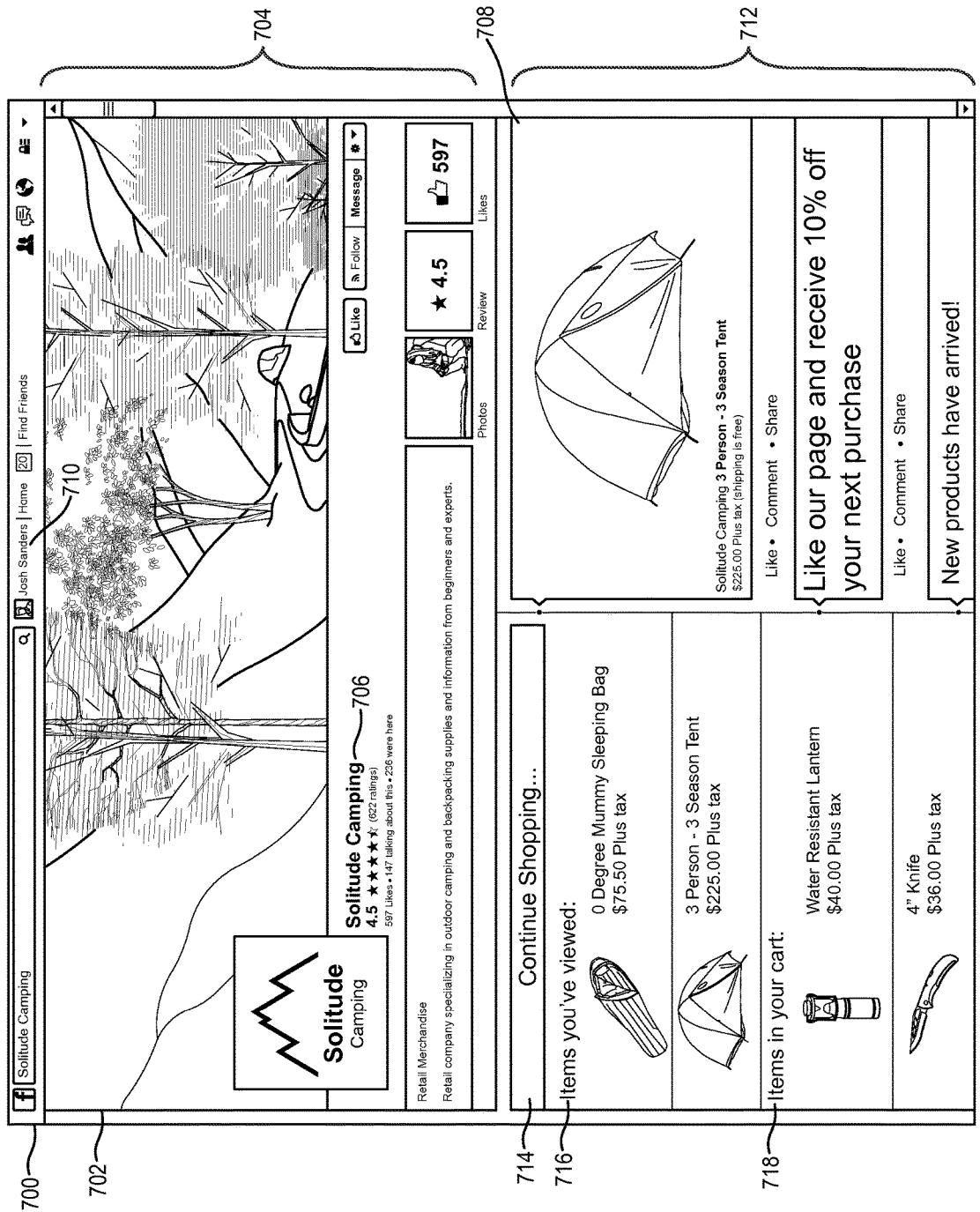
FIG. 7 illustrates an example graphical user interface within a social networking system that displays information corresponding to an activity session in accordance with one or more embodiments described herein.
Figure 8:
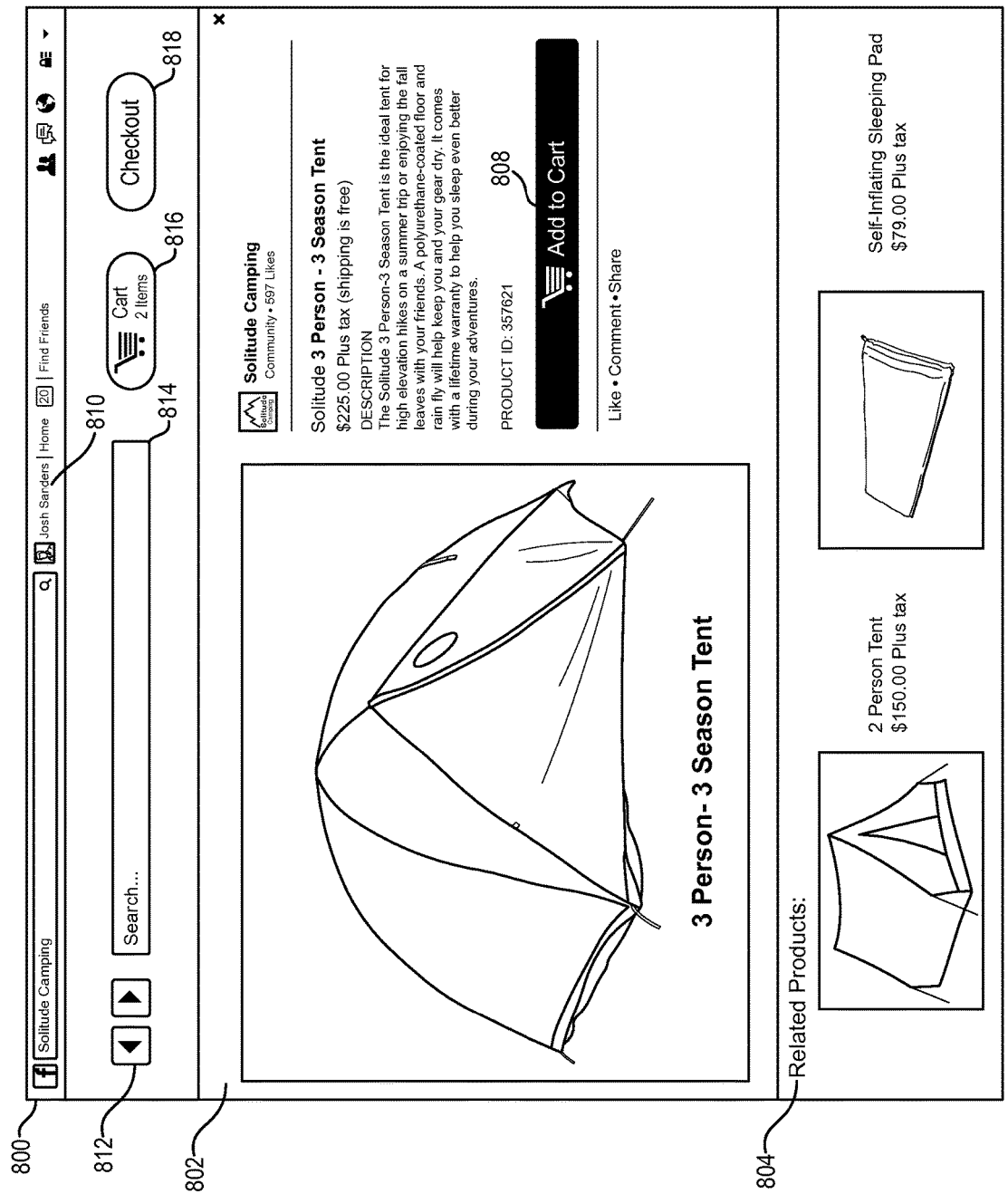
FIG. 8 illustrates an example graphical user interface that allows a user to resume a user activity session within a social networking system in accordance with one or more embodiments described herein.

Along these lines, FIGS. 7 and 8 display example embodiments of graphical user interfaces that allow a user to resume an activity session within a social networking system. In particular, FIG. 7 illustrates an example graphical user interface 700 (or simply, GUI 700) within a social networking system that displays information corresponding to an activity session in accordance with one or more embodiments described herein. As described in additional detail below, the persistent activity system can provide state information from an activity session to the social networking system, allowing the social networking system to provide a user access to a previously initiated activity session outside of the social networking system.

In one or more embodiments, for example, the GUI 700 may display a merchant social networking page 702 (or simply, "merchant page 702"). For example, upon a user providing a positive indication to resume an activity session with a third-party content provider (e.g., a merchant), the social networking system may redirect the user to the content provider's page (e.g., merchant page 702). Alternatively, a user may manually navigate to the merchant page 702.

The merchant page 702 can include a variety of information, content, and options associated with one or more social networking features. As shown, the merchant page includes a header portion 704 for a merchant 706, as viewed by a user 710. The header portion 704 can include general information and options associated with the merchant 706. In addition, the merchant page 702 can include a news feed 712 including a plurality of communications (e.g., posts) associated with the merchant 706. As shown, the news feed 712 can include one or more merchant posts, such as post 708 marketing a "3 Person—3 Season Tent."

In some example embodiments, the merchant page 702 includes a browsing and/or shopping portion, such as a shopping window 714. The shopping window 714 can include content relating to an activity session between the user 710 and the merchant 706. For example, a persistent activity system can provide activity session state information to the social networking system. In turn, the social networking system can use the state information to display content to the user in the shopping window 714. For example, the shopping window 714 can include items that the user has viewed 716 and items in the user's cart 718.

To illustrate, a user 710 (e.g., Josh Sanders) may browse camping equipment from Solitude Camping (e.g., the merchant 706) on Solitude Camping's website. The user 710 may view a sleeping pad and a three-person tent. Further, while on Solitude Camping's website, the user 710 may also add a lantern and a knife to the user's shopping cart. While viewing and interacting with content on Solitude Camping's website, the persistent activity system may be creating, and updating session state information associated with a corresponding activity session, as described above. The persistent activity system can provide the session state information to the social networking system to allow the social networking system to populate the shopping window 714 to correspond with the user's activity session. For example, the shopping window 714 may display items the user viewed 716, including the sleeping pad and the three-person tent, and display items the user added to his or her cart 718, including the lantern and the knife.

In one or more embodiments, the social networking system provides the user with a selectable option on the merchant page 702 to resume the activity session within the social networking system. For example, upon selecting an option to continue shopping, (e.g., clicking the shopping window 714), the social networking system may provide the user with a user interface that displays additional content to the user from the content provider.

In particular, FIG. 8 illustrates a graphical user interface (or "GUI 800") that allows a user 810 to resume an activity session within a social networking system in accordance with one or more embodiments described herein. In particular, when a user elects to continue an activity session within the social networking system, the social networking system may direct the user to GUI 800 to resume the activity session. As such, the GUI 800 may display content to the user based on session state information from an activity session between a user and the content provider while remaining within the social networking system.

As illustrated in FIG. 8, the GUI 800 can include a content section 802. The content section 802 may display content (e.g., a product) to the user associated with a particular content provider. The content section 802 may also include information corresponding to the content (e.g., product information) being displayed to the user. For example, content information can include one or more images of a product as well as textual information, such as the provider/manufacturer of the product, the name of the product, the price of the product, the product description, and/or the product identification number. In some embodiments, the content section 802 can also include additional or alternative content, such as comments, reviews, additional images, product information for related products, etc.

In one or more embodiments, the content the social networking system displays in the content section 802 may be the last product the user viewed as part of an active activity session. To illustrate, the user 810 may have viewed a three-person tent on Solitude Camping's website before switching over to the social networking system. As such, the last activity session state for the activity session associated with Solitude Camping includes the three-person tent. Upon the user switching to the social networking system and electing to resume the activity session, the persistent activity system can provide the social networking system with the last activity session state of the user's activity session (e.g., the three-person tent). Based on the last activity session state, the social networking system may display the three-person tent to the user 810 within the content section 802.

As shown in FIG. 8, the content section 802 can include a selectable option 806 (e.g., the "Add to Cart" button) for adding the product to the cart 816. Upon choosing the selectable option 806, the current product the user is viewing (e.g., the three-person tent) may be added to the user's cart along with other products the user has previously added to the cart, regardless of the medium (e.g., application) or client device on which the user added the previous products. As such, the user 810 can continue to add products to his or her cart while remaining within the social networking system, and the persistent activity system can continue to update the state information corresponding to the activity session.

The GUI 800 can also display related products 804, as shown in FIG. 8. For example, the related products 804 may correspond to the product displayed in the content section 802. Alternatively, the related products 804 may be products associated with the user's activity session or previously viewed products. In yet another alternative, the related products 804 may display suggested products or products the content provider recommends to market to the user 810 (e.g., advertisements or products on sale). Upon the user 810 selecting a product in the related products area, the content section 802 may display the selected product along with information regarding the selected product. In this manner, the user 810 can continue to browse and shop content from the content provider within the social networking system.

In displaying products, such as related products, to a user, the social networking system may access product information maintained by the social networking system. For example, as described below in connection with FIGS. 12 and 13, each product may correspond to a concept node that includes product information (e.g., product images, descriptions, ratings, prices, identifiers, etc.) and product associations. For instance, a concept node may include the association between a product and a content provider. Accordingly, the social networking system can assist a user in browsing through products offered by a content provider while allowing the user to remain within the social networking system.

As illustrated in FIG. 8, the GUI 800 can also include navigation buttons 812. For example, the navigation buttons 812 can include a forward and back navigation button. The navigation buttons 812 may allow a user to navigate within an activity session. For example, upon selecting the back navigation button, the content section 802 may update to display a product the user was previously viewing. In particular, the persistent activity system can provide the social networking system with state information (e.g., historical activity session states) to allow the social networking system to display previously viewed products to the user, as described above. In this manner, the persistent activity system can allow the user the ability to seamlessly navigate backwards and forwards through an activity session within the social networking system, even if the user initiated the activity session on a different medium or a different device.

In addition, in one or more embodiments, the user 810 can search for content offered by the content provider within the social networking system. In particular, the user 810 can use a search field 814 to browse for additional content, such as products. Furthermore, as the user continues to interact with content (e.g., select search results, view products, add products to a cart) the persistent activity system can update the activity session for the user, as described above. Therefore, in the event the user switches to another client device and/or medium prior to ending an activity session, the persistent activity system can enable the other client device and/or medium to resume the activity session.

As illustrated in FIG. 8, the GUI 800 may also display a shopping cart 816 (or simply, "cart"). A shopping cart may include products the user desires to purchase, such as products the user selected using the selectable option 806 (e.g., "Add to Cart"). The cart 816 may display the number of items in the cart. For example, the cart 816 in FIG. 8 includes two items. Further, upon selecting the shopping cart, the user 810 may be shown a detailed summary of the items in the cart 816.

Products in the cart 816 can include products the user 810 added while using a different medium and/or client device. For example, the user 810 may have added two products to the cart while browsing on a content provider's website, and then switched to the social networking system, where the user added additional products to the cart. Thus, using the principles described herein, the persistent activity system allows both the content provider and the social networking system to maintain an up-to-date shopping cart regardless of which medium and/or client device the user may be using during an activity session.

The GUI 800 also includes a selectable checkout option 818. The selectable checkout option 818 allows the user to purchase products in the user's cart 816. Based on receiving a selection of the selectable checkout option 818, the social networking system can initiate a purchasing process for the user 810 to purchase one or more products. In some examples, the purchase can be initiated and executed by way of the social networking system (e.g., the social networking system can facilitate and manage the purchase). In additional or alternative embodiments, the social networking system can redirect the user 810 to a third-party system or service (e.g., a website associated with content provider or another third-party service) for finalizing the purchase.

Figure 9:
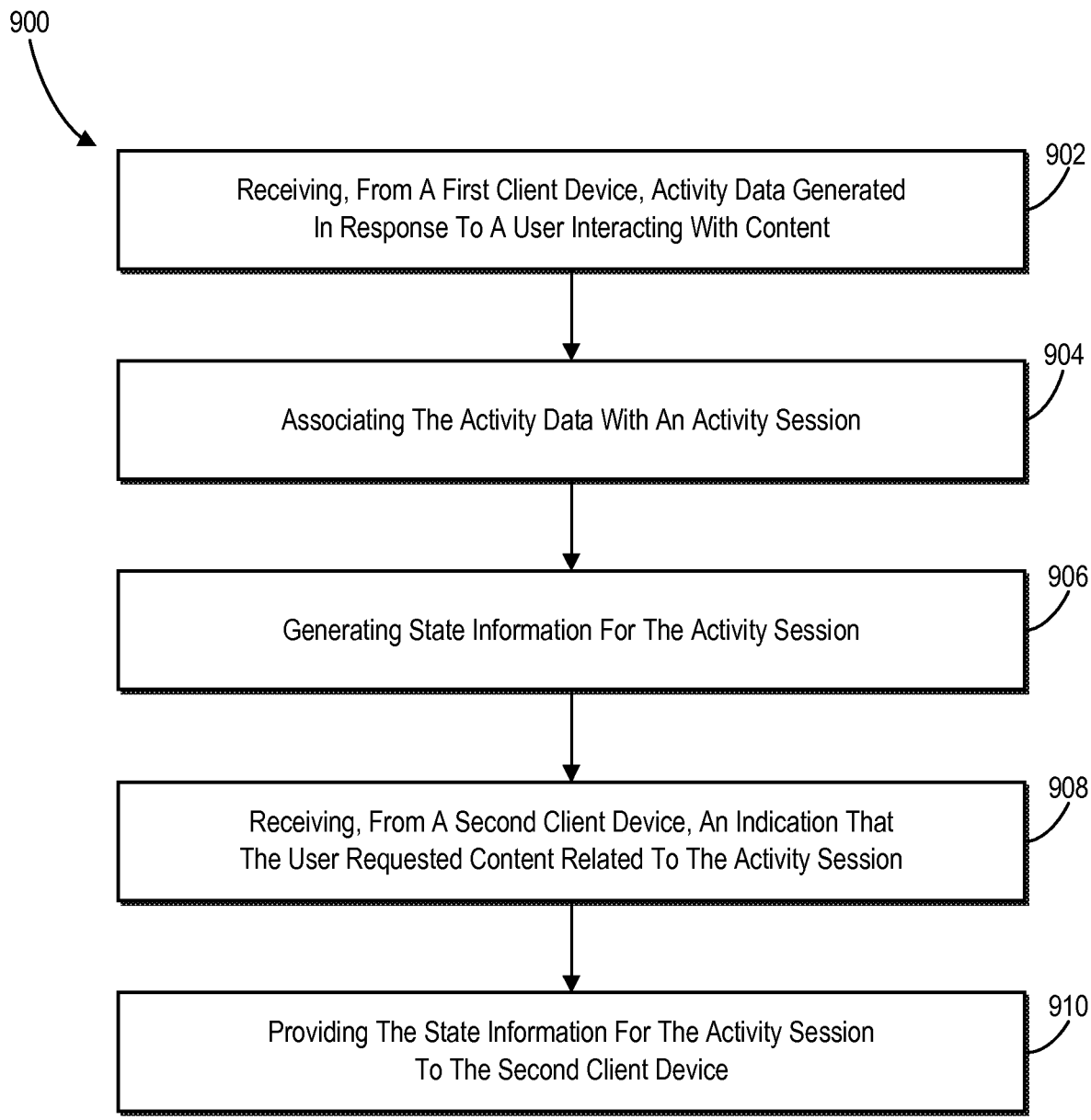
FIG. 9 illustrates a flowchart of a method of providing a seamless user activity session across multiple client devices in accordance with one or more embodiments described herein.
Figure 10:
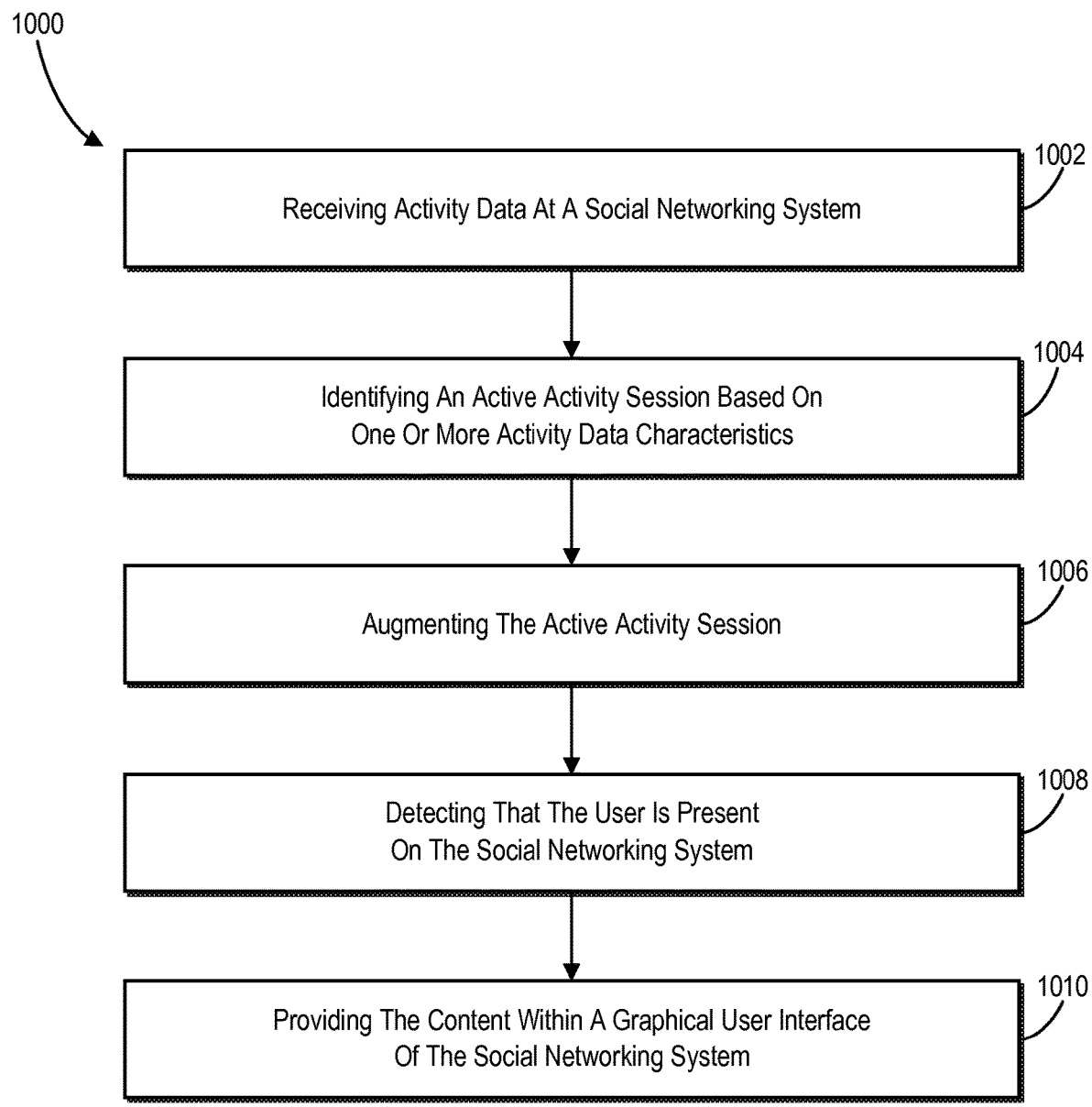
FIG. 10 illustrates a flowchart of a method of providing a seamless user activity session in connection with a social networking system in accordance with one or more embodiments described herein.

FIGS. 1-8, the corresponding text, and the examples, provide a number of different systems and devices for improving a user experience related to interacting with content across multiple client devices and/or mediums. In addition to the foregoing, embodiments of the present invention also can be described in terms of flowcharts comprising acts and steps in a method for accomplishing a particular result. For example, FIGS. 9-10 illustrate flowcharts of exemplary methods in accordance with one or more embodiments of the present invention. The methods described in relation to FIGS. 9-10 can be performed with less or more steps/acts or the steps/acts can be performed in differing orders. Additionally, the steps/acts described herein can be repeated or performed in parallel with one another or in parallel with different instances of the same or similar steps/acts.

FIG. 9 illustrates a flowchart of a method 900 of providing a seamless user activity session across multiple client devices in accordance with one or more embodiments described herein. For example, the method 900 can include an act 902 of receiving, from a first client device, activity data generated in response to a user interacting with content. In particular, the act 902 can include receiving, from a first client device, activity data generated in response to a user interacting with content on the first client device. For example, the act 902 may include an activity manager of a persistent activity system receiving activity data from the first client device, in any suitable manner as disclosed herein.

Furthermore, the method 900 can also include an act 904 of associating the activity data with an activity session. In particular, the act 904 can include associating, using one or more processors, the activity data with an activity session corresponding to the user. For example, the act 904 can include a session manager of a persistent activity system determining the activity data corresponds to an active activity session, and therefore, associating the activity data with the active activity system. Alternatively, the act 904 can include a session manager of a persistent activity system determining that the activity data does not correspond with an active activity session, and therefore, creating a new activity session with which to associate the activity data, as explained in detail above.

In addition, the method 900 further includes an act 906 of generating state information for the activity session. In particular, the act 906 may include generating, based on the activity data, state information for the activity session, the state information comprising a last activity session state and one or more historical activity session states. For example, the act 904 may include a session manager of a persistent activity system generating state information using content IDs, content provider ID, user ID, and session activity information included within the activity data.

Additionally, the method 900 can also include an act 908 of receiving, from a second client device, an indication that the user requested content related to the activity session. In particular, the act 908 may include receiving, from a second client device, an indication that the user requested content related to the activity session. For example, the act 908 may include the activity monitor 212 and/or the session manager 214 receiving an indication (e.g., additional activity data) that the user requested content from a content provider that is associated with an activity session.

Furthermore, the method 900 can include an act 910 of providing the state information for the activity session to the second client device. In particular, the act 910 may include providing, to the second client device, the state information for the activity session, wherein the state information allows the second client device to resume the activity session. For example, the act 910 may include a session coordinator of the persistent activity system providing state information corresponding to an activity session to the second device, wherein the state information allows the second client device to present content in accordance with the user's previous activity on the first client device.

FIG. 10 illustrates a flowchart of a method 1000 of providing a seamless user activity session in connection with a social networking system in accordance with one or more embodiments described herein. The method 1000 includes an act of 1002 of receiving activity data at a social networking system. In particular, the act 1002 may include receiving, at a social networking system, activity data corresponding to an interaction of a user with content from a third-party content provider. For example, the act 1002 may include an activity manager of a persistent activity system receiving activity data from the first client device, in any suitable manner as disclosed herein.

Furthermore, the method 1000 can also include an act 1004 of identifying an active activity session based on one or more activity data characteristics. In particular, the act 1004 can include identifying, using one or more processors, an active activity session based on one or more activity data characteristics, the active activity session comprising state information corresponding to previous interactions of the user with content from the third-party content provider. For instance, the act 1004 can include a session manager of a persistent activity system determining the activity data relates to content provided by a third-party content provider associated with an active activity session.

In addition, the method 1000 can also include an act 1006 of augmenting the active activity session. In particular, the act 1004 may include augmenting, based on the received activity data, the active activity session to include the interaction of the user with the content. For example, the act 1006 may include a session manager of a persistent activity system updating state information within the active activity session to associate the user interaction with the content as the last activity session state.

The method 1000 can additionally include an act 1008 of detecting that the user is present on the social networking system. In particular, the act 1008 may include detecting, using one or more processors, that the user is present on the social networking system. For example, the act 1008 may include the activity monitor 212 and/or the session manager 214 receiving an indication that the user has accessed the social networking system 104, for example, when the user logs into the social networking system.

Furthermore, the method 1000 can include an act 1010 of providing the content within a graphical user interface of the social networking system. In particular, the act 1010 may include, in response to detecting the user is present on the social networking system, providing the content within a graphical user interface of the social networking system to allow the user to resume interacting with the content. For example, the act 1010 may include a session coordinator of a persistent activity system facilitating for the social networking system providing the content to the user via a social networking system interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
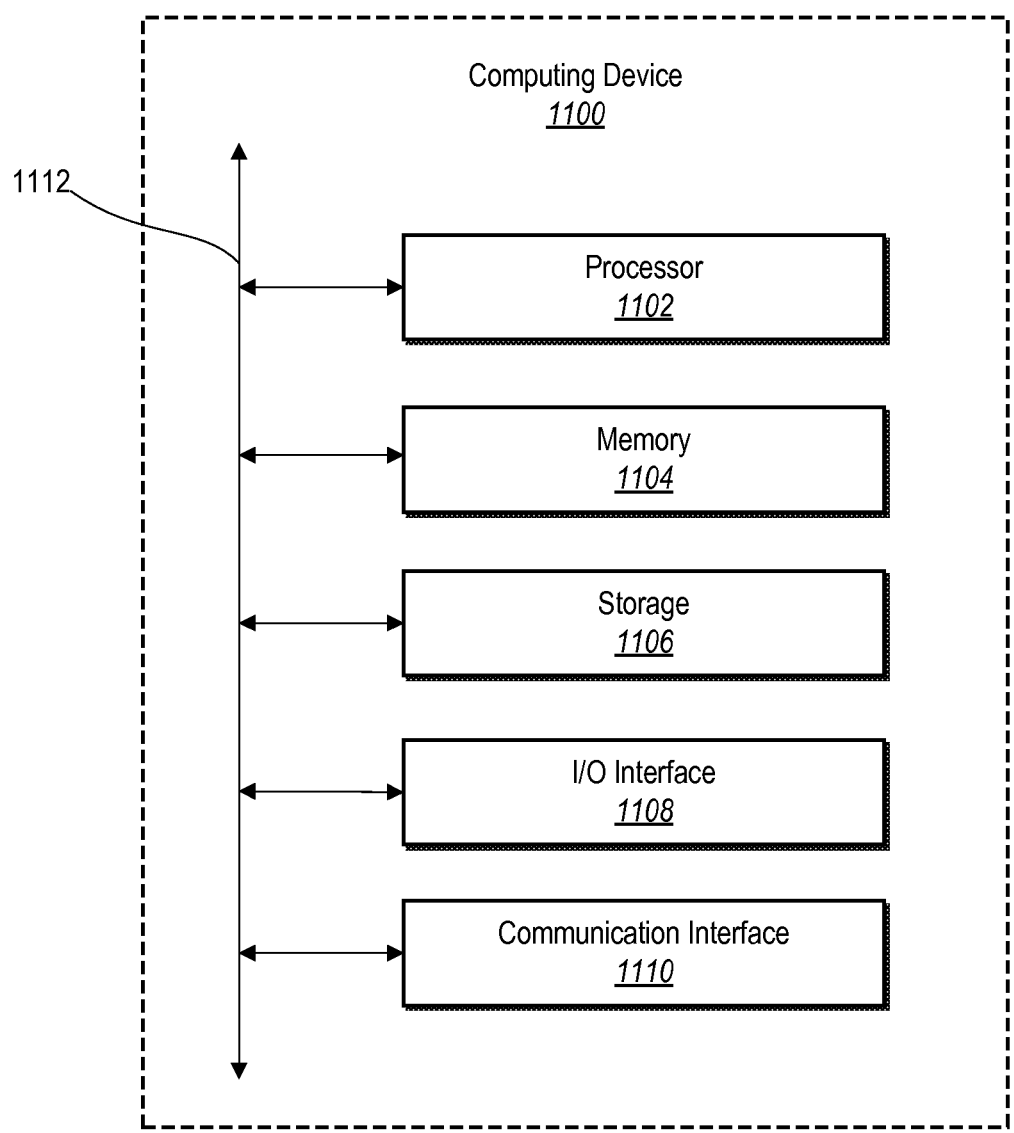
FIG. 11 illustrates a block diagram of a client device in accordance with one or more embodiments described herein.

FIG. 11 illustrates a block diagram of exemplary computing device 1100 that may be configured to perform one or more of the processes described above. One will appreciate that one or more computing devices such as the computing device 1100 may implement the communication system 100. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the communication system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 12:
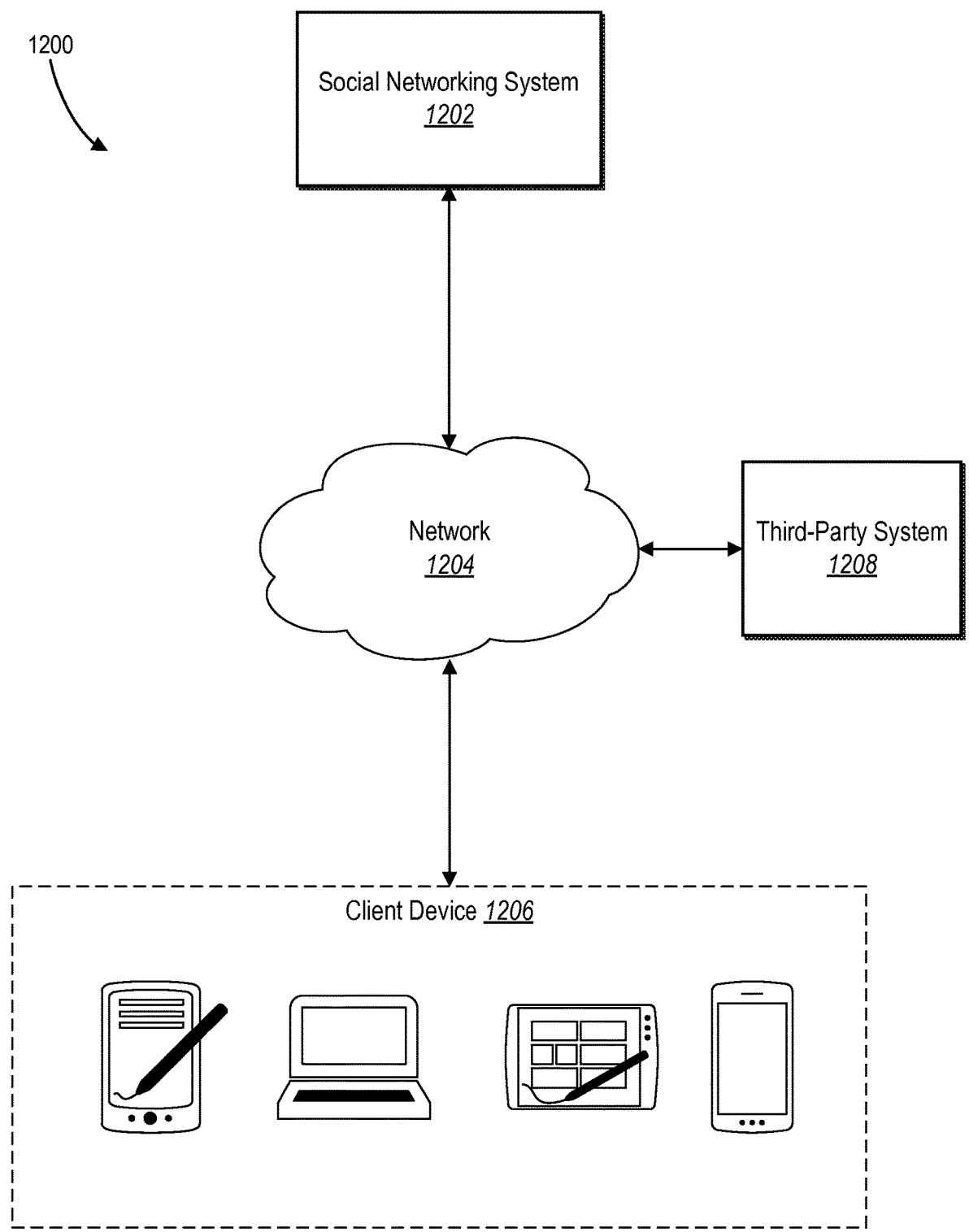
FIG. 12 illustrates a network environment of a social networking system in accordance with one or more embodiments described herein.

FIG. 12 illustrates an example network environment 1200 of a social networking system. Network environment 1200 includes a client system 1206, a social networking system 1202, and a third-party system 1208 connected to each other by a network 1204. Although FIG. 12 illustrates a particular arrangement of client system 1206, social networking system 1202, third-party system 1208, and network 1204, this disclosure contemplates any suitable arrangement of client system 1206, social networking system 1202, third-party system 1208, and network 1204. As an example and not by way of limitation, two or more of client system 1206, social networking system 1202, and third-party system 1208 may be connected to each other directly, bypassing network 1204. As another example, two or more of client system 1206, social networking system 1202, and third-party system 1208 may be physically or logically co-located with each other in whole, or in part. Moreover, although FIG. 12 illustrates a particular number of client systems 1206, social networking systems 1202, third-party systems 1208, and networks 1204, this disclosure contemplates any suitable number of client systems 1206, social networking systems 1202, third-party systems 1208, and networks 1204. As an example and not by way of limitation, network environment 1200 may include multiple client system 1206, social networking systems 1202, third-party systems 1208, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client system 1206, social networking system 1202, and third-party system 1208 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client system 1206 may be an electronic device including hardware, software, or embedded logic components or a combination of two or more such components and capable of carrying out the appropriate functionalities implemented or supported by client system 1206. As an example and not by way of limitation, a client system 1206 may include any of the computing devices discussed above in relation to FIG. 11. A client system 1206 may enable a network user at client system 1206 to access network 1204. A client system 1206 may enable its user to communicate with other users at other client systems 1206.

In particular embodiments, client system 1206 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1206 may enter a Uniform Resource Locator (URL) or other address directing the web browser to a particular server (such as server, or a server associated with a third-party system 1208), and the web browser may generate a Hyper Text Transfer Protocol (HTTP) request and communicate the HTTP request to server. The server may accept the HTTP request and communicate to client system 1206 one or more Hyper Text Markup Language (HTML) files responsive to the HTTP request. Client system 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 1202 may be a network-addressable computing system that can host an online social network. Social networking system 1202 may generate, store, receive, and send social-networking data, such as, for example, user-profile data, concept-profile data, social-graph information, or other suitable data related to the online social network. Social networking system 1202 may be accessed by the other components of network environment 1200 either directly or via network 1204. In particular embodiments, social networking system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1206, a social networking system 1202, or a third-party system 1208 to manage, retrieve, modify, add, or delete, the information stored in data store.

In particular embodiments, social networking system 1202 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 1202 may provide users of the online social network the ability to communicate and interact with other users. In particular embodiments, users may join the online social network via social networking system 1202 and then add connections (e.g., relationships) to a number of other users of social networking system 1202 whom they want to be connected to. Herein, the term "friend" may refer to any other user of social networking system 1202 with which a user has formed a connection, association, or relationship via social networking system 1202.

In particular embodiments, social networking system 1202 may provide users with the ability to take actions on various types of items or objects, supported by social networking system 1202. As an example and not by way of limitation, the items and objects may include groups or social networks to which users of social networking system 1202 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 1202 or by an external system of third-party system 1208, which is separate from social networking system 1202 and coupled to social networking system 1202 via a network 1204.

In particular embodiments, social networking system 1202 may be capable of linking a variety of entities. As an example and not by way of limitation, social networking system 1202 may enable users to interact with each other as well as receive content from third-party systems 1208 or other entities, or to allow users to interact with these entities through an application programming interfaces (API) or other communication channels.

In particular embodiments, a third-party system 1208 may include one or more types of servers, one or more data stores, one or more interfaces, including but not limited to APIs, one or more web services, one or more content sources, one or more networks, or any other suitable components, e.g., that servers may communicate with. A third-party system 1208 may be operated by a different entity from an entity operating social networking system 1202. In particular embodiments, however, social networking system 1202 and third-party systems 1208 may operate in conjunction with each other to provide social-networking services to users of social networking system 1202 or third-party systems 1208. In this sense, social networking system 1202 may provide a platform, or backbone, which other systems, such as third-party systems 1208, may use to provide social-networking services and functionality to users across the Internet.

In particular embodiments, a third-party system 1208 may include a third-party content object provider. A third-party content object provider may include one or more sources of content objects, which may be communicated to a client system 1206. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 1202 also includes user-generated content objects, which may enhance a user's interactions with social networking system 1202. User-generated content may include anything a user can add, upload, send, or "post" to social networking system 1202. As an example and not by way of limitation, a user communicates posts to social networking system 1202 from a client system 1206. Posts may include data such as status updates or other textual data, location information, photos, videos, links, music or other similar data or media. Content may also be added to social networking system 1202 by a third-party through a "communication channel," such as a newsfeed or stream.

In particular embodiments, social networking system 1202 may include a variety of servers, sub-systems, programs, modules, logs, and data stores. In particular embodiments, social networking system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 1202 may also include suitable components such as network interfaces, security mechanisms, load balancers, failover servers, management-and-network-operations consoles, other suitable components, or any suitable combination thereof. In particular embodiments, social networking system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 1202 to one or more client systems 1206 or one or more third-party system 1208 via network 1204. The web server may include a mail server or other messaging functionality for receiving and routing messages between social networking system 1202 and one or more client systems 1206. An API-request server may allow a third-party system 1208 to access information from social networking system 1202 by calling one or more APIs. An action logger may be used to receive communications from a web server about a user's actions on or off social networking system 1202. In conjunction with the action log, a third-party-content-object log may be maintained of user exposures to third-party-content objects. A notification controller may provide information regarding content objects to a client system 1206. Information may be pushed to a client system 1206 as notifications, or information may be pulled from client system 1206 responsive to a request received from client system 1206. Authorization servers may be used to enforce one or more privacy settings of the users of social networking system 1202. A privacy setting of a user determines how particular information associated with a user can be shared. The authorization server may allow users to opt in to or opt out of having their actions logged by social networking system 1202 or shared with other systems (e.g., third-party system 1208), such as, for example, by setting appropriate privacy settings. Third-party-content-object stores may be used to store content objects received from third parties, such as a third-party system 1208. Location stores may be used for storing location information received from client systems 1206 associated with users. Advertisement-pricing modules may combine social information, the current time, location information, or other suitable information to provide relevant advertisements, in the form of notifications, to a user.

Figure 13:
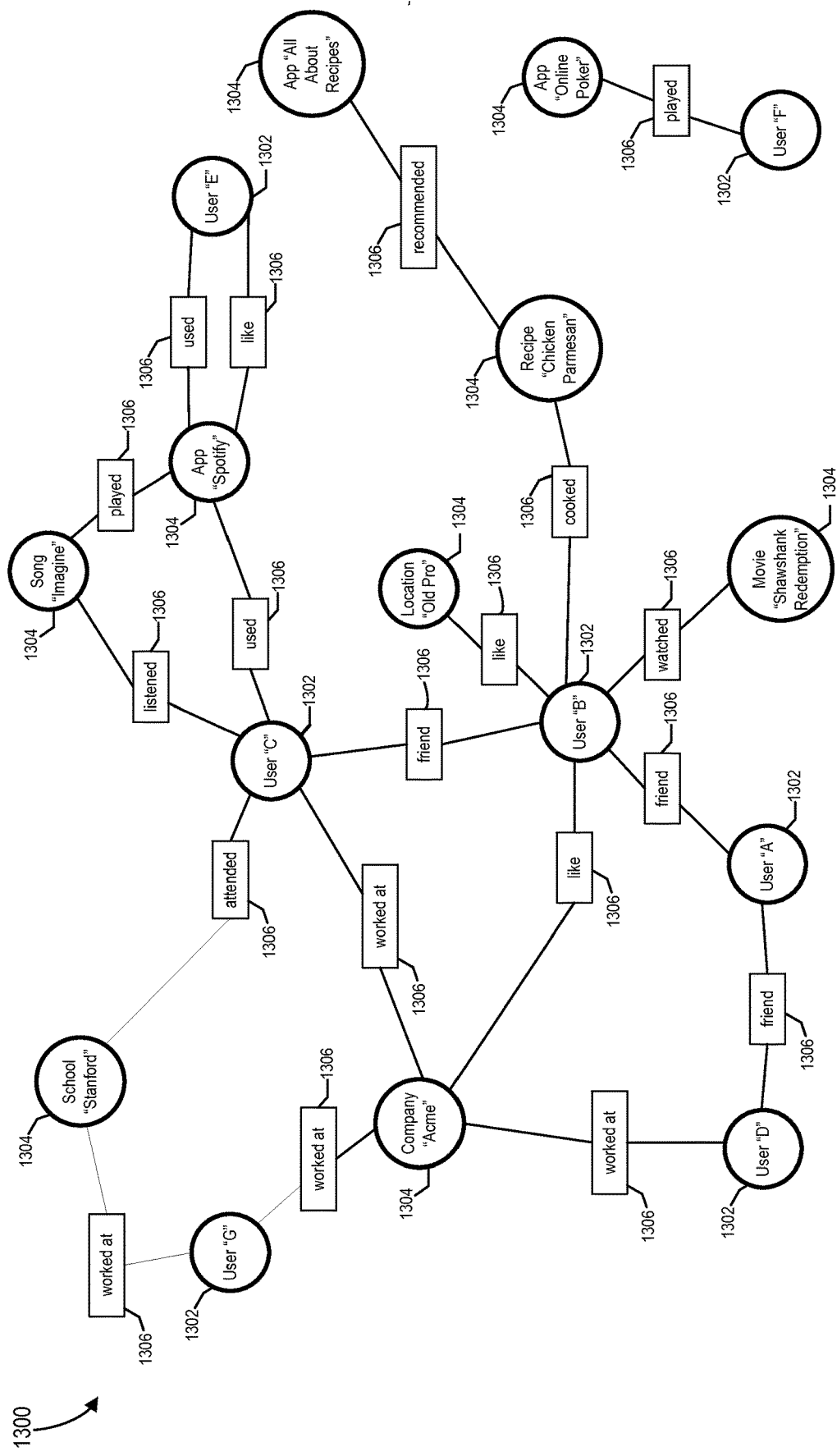
FIG. 13 illustrates an example social graph of a social networking system in accordance with one or more embodiments described herein.

FIG. 13 illustrates example social graph 1300. In particular embodiments, social networking system 1202 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a social networking system 1202, client system 1206, or third-party system 1208 may access social graph 1300 and related social-graph information for suitable applications. The nodes and edges of social graph 1300 may be stored as data objects, for example, in a data store (such as a social-graph database). Such a data store may include one or more searchable or query able indexes of nodes or edges of social graph 1300.

In particular embodiments, a user node 1302 may correspond to a user of social networking system 1202. As an example and not by way of limitation, a user may be an individual (human user), an entity (e.g., an enterprise, business, or third-party application), or a group (e.g., of individuals or entities) that interacts or communicates with or over social networking system 1202. In particular embodiments, when a user registers for an account with social networking system 1202, social networking system 1202 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with social networking system 1202. In particular embodiments, a user node 1302 may be associated with information provided by a user or information gathered by various systems, including social networking system 1202. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1304 may correspond to a concept. As an example and not by way of limitation, a concept may correspond to a place (such as, for example, a movie theater, restaurant, landmark, or city); a website (such as, for example, a website associated with social-network system 1202 or a third-party website associated with a web-application server); an entity (such as, for example, a person, business, group, sports team, or celebrity); a resource (such as, for example, an audio file, video file, digital photo, text file, structured document, or application) which may be located within social networking system 1202 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including social networking system 1202. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to social networking system 1202. Profile pages may also be hosted on third-party websites associated with a third-party server 1208. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 1208. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1206 to send to social networking system 1202 a message indicating the user's action. In response to the message, social networking system 1202 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, social networking system 1202 may send a "friend request" to the second user. If the second user confirms the "friend request," social networking system 1202 may create an edge 1306 connecting the first user's user node 1302 to the second user's user node 1302 in social graph 1300 and store edge 1306 as social-graph information in one or more of data stores. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to a edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, social networking system 1202 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1202 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, social networking system 1202 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, social networking system 1202 may create an edge 1306 between a user node 1302 and a concept node 1304 in social graph 1300. As an example and not by way of limitation, a user viewing a concept-profile page (such as, for example, by using a web browser or a special-purpose application hosted by the user's client system 1206) may indicate that he or she likes the concept represented by the concept node 1304 by clicking or selecting a "Like" icon, which may cause the user's client system 1206 to send to social networking system 1202 a message indicating the user's liking of the concept associated with the concept-profile page. In response to the message, social networking system 1202 may create an edge 1306 between user node 1302 associated with the user and concept node 1304, as illustrated by "like" edge 1306 between the user and concept node 1304. In particular embodiments, social networking system 1202 may store an edge 1306 in one or more data stores. In particular embodiments, an edge 1306 may be automatically formed by social networking system 1202 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1202). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1202 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1202) or RSVP (e.g., through social networking system 1202) to an event associated with the advertisement. In addition or as an alternative, an advertisement may include social-networking-system context directed to the user. As an example and not by way of limitation, an advertisement may display information about a friend of the user within social networking system 1202 who has taken an action associated with the subject matter of the advertisement.

In particular embodiments, social networking system 1202 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1208 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1202 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1202 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1202 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1202 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1202 may calculate a coefficient based on a user's actions. Social networking system 1202 may monitor such actions on the online social network, on a third-party system 1208, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1202 may calculate a coefficient based on the user's actions with particular types of content. The content may be associated with the online social network, a third-party system 1208, or another suitable system. The content may include users, profile pages, posts, news stories, headlines, instant messages, chat room conversations, emails, advertisements, pictures, video, music, other suitable objects, or any combination thereof. Social networking system 1202 may analyze a user's actions to determine whether one or more of the actions indicate an affinity for subject matter, content, other users, and so forth. As an example and not by way of limitation, if a user may make frequently posts content related to "coffee" or variants thereof, social networking system 1202 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1202 may calculate a coefficient based on the type of relationship between particular objects. Referencing the social graph 1300, social networking system 1202 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than a user nodes 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1202 may determine that the user has a higher coefficient with respect to the first photo than the second photo because having a tagged-in-type relationship with content may be assigned a higher weight and/or rating than having a like-type relationship with content. In particular embodiments, social networking system 1202 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1202 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, social networking system 1202 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1206 of the user). A first user may be more interested in other users or concepts that are closer to the first user. As an example and not by way of limitation, if a user is one mile from an airport and two miles from a gas station, social networking system 1202 may determine that the user has a higher coefficient for the airport than the gas station based on the proximity of the airport to the user.

In particular embodiments, social networking system 1202 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1202 may provide information that is relevant to user's interests and current circumstances, increasing the likelihood that they will find such information of interest. In particular embodiments, social networking system 1202 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1202 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1202 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1208 (e.g., via an API or other communication channel), or from another suitable system. In response to the request, social networking system 1202 may calculate the coefficient (or access the coefficient information if it has previously been calculated and stored). In particular embodiments, social networking system 1202 may measure an affinity with respect to a particular process. Different processes (both internal and external to the online social network) may request a coefficient for a particular object or set of objects. Social networking system 1202 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1304 corresponding to a particular photo may have a privacy setting specifying that the photo may only be accessed by users tagged in the photo and their friends. In particular embodiments, privacy settings may allow users to opt in or opt out of having their actions logged by social networking system 1202 or shared with other systems (e.g., third-party system 1208). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1208, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1202 may send a request to the data store for the object. The request may identify the user associated with the request and may only be sent to the user (or a client system 1206 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
    receiving, at a server device and from a content provider that is remote from the server device and from a first client device, activity data generated in response to a user interacting with content of the content provider on the first client device associated with the user;
    associating, at the server device, the activity data with an activity session corresponding to the user;
    generating, based on the activity data, state information for the activity session, the state information comprising a last activity session state and one or more historical activity session states;
    receiving, at the server device and from the content provider, a request to provide state information for a second client device that is remote from the content provider, wherein the request comprises an indication of the second client device;

determining, at the server device and in response to the request, that the second client device is associated with the user; and providing, based on the second client device being associated with the user and in response to the request, the state information for the activity session to the content provider, wherein the state information allows the second client device to resume the activity session with the content provider.

2. The method of claim 1, wherein receiving activity data from the content provider comprises receiving activity data from the content provider without the user providing login information to the content provider.

3. The method of claim 2, wherein providing the state information for the activity session to the second client device comprises providing the state information for the activity session to the second client device without the user providing login information to the content provider from the second client device.

4. The method of claim 1, further comprising determining, at the server device, that the activity data from the content provider corresponds to an active activity session for the user.

5. The method of claim 4, wherein associating the activity data with the activity session corresponding to the user comprises associating the activity data with a user identifier associated with the user.

6. The method of claim 5, further comprising determining the activity session has expired at an expiration of a predefined time period without receiving additional activity data related to the activity session.

7. The method of claim 1, wherein receiving the activity data comprises:
receiving a first client device identifier of the first client device; and
determining that the first client device identifier is associated with a user identifier.

8. The method of claim 7, wherein determining that the second client device is associated with the user comprises:
receiving, from the content provider, a second device identifier of the second client device;
determining that the second device identifier is associated with the user identifier; and
identifying the state information for the activity session based on the user identifier.

9. The method of claim 1, wherein the state information for the activity session comprises one or more of product searches, product views, activity history, products added to a shopping cart, or product purchases.

10. The method of claim 1, wherein generating the state information based on the activity data comprises creating a timestamp corresponding to a time of receiving the activity data.

11. The method of claim 9, further comprising:
receiving, subsequent to providing the second client device the state information for the activity session, one or more indicators from the second client device to navigate to content with which the user previously interacted; and
providing, to the second client device, the one or more historical activity session states in reverse chronological order according to a timestamp associated with each of the one or more historical activity session states.

12. The method of claim 10, wherein the activity data further comprises a user identifier associated with a user profile within a social networking system.

13. The method of claim 1, further comprising:
receiving, from the second client device, additional activity data corresponding to additional activity of the user on the second client device; and
updating the state information for the activity session based on the additional activity data by:
setting the last activity session state to a historical activity session state; and
replacing the last activity session state to comprise the additional activity data.

14. The method of claim 1, further comprising providing, to the second client device, instructions to cause the second client device to present an option to the user to resume the activity session on the second client device.

15. The method of claim 13, further comprising providing, to the second client device, instructions to cause the second client device to present an option to initiate a new activity session on the second client device.

16. A system, comprising:
at least one processor;
at least on non-transitory computer readable storage medium storing instructions thereon that, when executed by the at least one processor, cause the system to:
receive, at a server device and from a content provider that is remote from the server device and from a first client device, activity data generated in response to a user interacting with content of the content provider on the first client device associated with the user;
associate, at the server device, the activity data with an activity session corresponding to the user;
generate, based on the activity data, state information for the activity session, the state information comprising a last activity session state and one or more historical activity session states;
receive, at the server device and from the content provider, a request to provide state information for a second client device that is remote from the content provider, wherein the request comprises an indication of the second client device;
determine, at the server device and in response to the request, that the second client device is associated with the user; and
provide, based on the second client device being associated with the user and in response to the request, the state information for the activity session to the content provider, wherein the state information allows the second client device to resume the activity session with the content provider.

17. The system of claim 16, wherein the state information for the activity session comprises one or more of product searches, product views, activity history, products added to a shopping cart, or product purchases.

18. The system of claim 16, wherein the instructions, when executed by the at least one processor, cause the system to receive activity data from the content provider by receiving activity data from the content provider without the user providing login information to the content provider.

19. The system of claim 18, wherein the instructions, when executed by the at least one processor, cause the system to provide the state information for the activity session to the second client device by providing the state information for the activity session to the second client device without the user providing login information to the content provider from the second client device.

20. A non-transitory computer readable medium storing instructions that, when executed by at least one processor, cause a computer system to:
- receive, at a server device and from a content provider that is remote from the server device and from a first client device, activity data generated in response to a user interacting with content of the content provider on the first client device associated with the user;
- associate, at the server device, the activity data with an activity session corresponding to the user;
- generate, based on the activity data, state information for the activity session, the state information comprising a last activity session state and one or more historical activity session states;
- receive, at the server device and from the content provider, a request to provide state information for a second client device that is remote from the content provider, wherein the request comprises an indication of the second client device;
- determine, at the server device and in response to the request, that the second client device is associated with the user; and
- provide, based on the second client device being associated with the user and in response to the request, the state information for the activity session to the content provider, wherein the state information allows the second client device to resume the activity session with the content provider.

* * * * *